(12) United States Patent
Kataoka et al.

(10) Patent No.: US 12,467,158 B2
(45) Date of Patent: Nov. 11, 2025

(54) LITHIUM COMPOSITE OXIDE SINGLE CRYSTAL, LITHIUM COMPOSITE OXIDE POLYCRYSTAL, LITHIUM COMPOSITE OXIDE MATERIAL, SOLID ELECTROLYTE MATERIAL, ALL- SOLID-STATE LITHIUM-ION SECONDARY BATTERY, AND METHOD FOR PRODUCING SOLID ELECTROLYTE MATERIAL

(71) Applicant: NATIONAL INSTITUTE OF ADVANCED INDUSTRIAL SCIENCE AND TECHNOLOGY, Tokyo (JP)

(72) Inventors: Kunimitsu Kataoka, Tsukuba (JP); Junji Akimoto, Tsukuba (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 260 days.

(21) Appl. No.: 18/252,853

(22) PCT Filed: Nov. 12, 2021

(86) PCT No.: PCT/JP2021/041657
§ 371 (c)(1),
(2) Date: May 12, 2023

(87) PCT Pub. No.: WO2022/107687
PCT Pub. Date: May 27, 2022

(65) Prior Publication Data
US 2024/0003052 A1 Jan. 4, 2024

(30) Foreign Application Priority Data
Nov. 17, 2020 (JP) .................................. 2020-191100

(51) Int. Cl.
C30B 13/14 (2006.01)
C30B 13/28 (2006.01)
(Continued)

(52) U.S. Cl.
CPC .............. C30B 29/30 (2013.01); C30B 13/14 (2013.01); C30B 13/28 (2013.01);
(Continued)

(58) Field of Classification Search
CPC ......... C30B 29/30; C30B 13/14; C30B 13/28; H01M 10/0525; H01M 10/0562; H01M 2300/0071
See application file for complete search history.

(56) References Cited

U.S. PATENT DOCUMENTS 10,483,585 B2 * 11/2019 Schneider ......... H01M 10/0562
10,693,184 B2 *  6/2020 Kataoka ................. C30B 15/20
(Continued)

FOREIGN PATENT DOCUMENTS

EP 3410529 A1 12/2018
EP 3466888 A1 4/2019
(Continued)

OTHER PUBLICATIONS

International Search Report mailed Jan. 18, 2022 in corresponding PCT International Application No. PCT/JP2021/041657.
(Continued)

Primary Examiner — Robert M Kunemund
(74) Attorney, Agent, or Firm — OSTROLENK FABER LLP

(57) ABSTRACT

The lithium composite oxide single crystal has a chemical composition represented by $Li_{7-3x-w-v}Ga_xLa_3Zr_{2-w-v}Ta_wNb_vO_{12}$ ($0.02 \leq x < 0.5$, $0 \leq W \leq 1.0$, $0 \leq V \leq 1.0$, and $0.05 \leq W+$
(Continued)

$V \leq 1.0$), which belongs to a space group I-43d in a cubic system and has a garnet structure.

20 Claims, 15 Drawing Sheets

(51) Int. Cl.
  *C30B 29/30* (2006.01)
  *H01M 10/0525* (2010.01)
  *H01M 10/0562* (2010.01)
(52) U.S. Cl.
  CPC ... *H01M 10/0525* (2013.01); *H01M 10/0562* (2013.01); *H01M 2300/0071* (2013.01)

(56) References Cited

U.S. PATENT DOCUMENTS

| 2017/0222258 A1 | 8/2017 | Kataoka et al. |
| 2018/0179080 A1 | 6/2018 | Akimoto et al. |
| 2020/0168946 A1* | 5/2020 | Yamamoto .......... H01M 10/058 |

FOREIGN PATENT DOCUMENTS

| JP | 2011-195373 A | 10/2011 |
| JP | 2020-516579 A | 6/2020 |
| JP | 2021-046340 A | 3/2021 |
| WO | WO 2016/017769 A1 | 2/2016 |
| WO | WO 2016/068040 A1 | 5/2016 |
| WO | WO 2017/033865 A1 | 3/2017 |
| WO | WO 2017/130622 A1 | 8/2017 |
| WO | WO 2018/195011 A1 | 10/2018 |

OTHER PUBLICATIONS

K. Kataoka et al., Lithium-ion conducting oxide single crystal as solid electrolyte for advanced lithium battery application, Scientific Reports, 8, 9965 (2018).

K. Kataoka et al., High Ionic Conductor Member of Garnet-Type Oxide $Li_{6.5}La_3Zr_{1.5}Ta_{0.5}O_{12}$, Chemelectrochem, 5, 2551 (2018).

R. Wagner et al., Crystal Structure of Garnet-Related Li-Ion Conductor $Li_{7-3x}Ga_xLa_3Zr_2O_{12}$: Fast Li-Ion Conduction Caused by a Different Cubic Modification?, Chemistry Materials, 28, 1861-1871 (2016).

L. Robben et al., Symmetry reduction due to gallium substitution in the garnet $Li_{6.43(2)}Ga_{0.52(3)}La_{2.67(4)}Zr_2O_{12}$, Crystallographic Communications, E72, 287-289 (2016).

LH. Abrha et al., Dual-Doped Cubic Garnet Solid Electrolytes with Superior Air Stability, Applied Materials Interfaces, 12, 25709-25717 (2020).

K. Kataoka et al., Single crystal growth and evaluation of gallium-substituted garnet type lithium solid electrolyte, 2019, 60th Battery Symposium in Japan.

Markus Kubicek, et al.: "Oxygen Vacancies in Fast Lithium-Ion Conducting Garnets", Chemistry of Materials, vol. 29, No. 17, Sep. 12, 2017 (Sep. 12, 2017), pp. 7189-7196, XP093079393, US ISSN: 0897-4756, DOI: 10.1021/acs.chemmater.7b01281.

Randy Jalem, et al.: "Effects of Gallium Doping in Garnet-Type $Li_7La_3Zr_2O_{12}$ Solid Electrolytes", Chemistry of Materials, vol. 27, No. 8, Apr. 17, 2015 (Apr. 17, 2015), pp. 2821-2831, XP055502566, US ISSN: 0897-4756, DOI: 10.1021/cm5045122.

Jianmeng Su, et al.: "Overcoming the abnormal grain growth in Ga-doped $Li_7La_3Zr_2O_{12}$ to enhance the electrochemical stability against Li metal", Ceramics International, vol. 45, No. 12, Apr. 30, 2019 (Apr. 30, 2019), pp. 14991-14996, XP085707596, ISSN: 0272-8842, DOI:10.1016/J.CERAMINT.2019.04.236.

* cited by examiner

D

D

LITHIUM COMPOSITE OXIDE SINGLE CRYSTAL, LITHIUM COMPOSITE OXIDE POLYCRYSTAL, LITHIUM COMPOSITE OXIDE MATERIAL, SOLID ELECTROLYTE MATERIAL, ALL- SOLID-STATE LITHIUM-ION SECONDARY BATTERY, AND METHOD FOR PRODUCING SOLID ELECTROLYTE MATERIAL

CROSS-REFERENCES TO RELATED APPLICATIONS

The present application is a 35 U.S.C. §§ 371 national stage application of International Application No. PCT/JP2021/041657, filed Nov. 12, 2021, which claims priority to Japanese Patent Application No. 2020-191100, filed Nov. 17, 2020, the contents of which are incorporated herein by reference.

TECHNICAL FIELD

The present invention relates to a lithium composite oxide single crystal, a lithium composite oxide polycrystal, a lithium composite oxide material, a solid electrolyte material, an all-solid-state lithium-ion secondary battery, and a method for producing a solid electrolyte material.

Priority is claimed on Japanese Patent Application No. 2020-191100, filed on Nov. 17, 2020, the content of which is incorporated herein by reference.

BACKGROUND ART

A lithium-ion secondary battery has a higher energy density than secondary batteries such as nickel-cadmium batteries and nickel-hydrogen batteries, and can be operated at high potentials, so that lithium-ion secondary batteries have been widely used in small information devices such as mobile phones and laptop computers. In addition, a lithium-ion secondary battery can be easily reduced in size and weight, so that in recent years, the demand for lithium-ion secondary batteries as secondary batteries for hybrid vehicles and electric vehicles has been increased. In consideration of safety, research and development of an all-solid-state lithium-ion secondary battery which does not use combustible electrolytes have been carried out. A solid electrolyte used in the all-solid-state lithium-ion secondary battery is required to have high ionic conductivity.

A material having a cubic garnet structure has been reported to have high ionic conductivity (see Patent Document 1), and research and development of the material having this structure have been underway. In particular, a material having a chemical composition represented by $Li_{7-x}La_3Zr_{2-x}Ta_xO_{12}$ or $Li_{7-x}La_3Zr_{2-x}Nb_xO_{12}$ has been reported to have high ionic conductivity in a case where a composition ratio x is close to 0.5 (see Non-Patent Documents 1 and 2). As the material which achieves high ionic conductivity, it is necessary to reduce grain boundary resistance or interface resistance as much as possible, so that a solid material which is a high-density molded body is desirable. The solid material which is a high-density molded body can prevent short circuits between a positive electrode and a negative electrode during charging and discharging process, and can be formed into thin pieces, so that the solid material can provide possibilities for future miniaturization of the all-solid-state lithium-ion secondary battery. However, it is known that these polycrystalline materials having a cubic garnet structure are difficult to sinter, making it difficult to produce the high-density molded body.

In recent years, a case of growing, by a melting method, a $Li_{7-x}La_3Zr_{2-x}Ta_xO_{12}$ single crystal or a $Li_{7-x}La_3Zr_{2-x}Nb_xO_{12}$ single crystal having a garnet structure has been reported (see Patent Documents 2 and 3).

In addition, in the recent years, a case of producing a sintered body of a cubic garnet structure $Li_{7-3x}Ga_xLa_3Zr_2O_{12}$ substituted with gallium to obtain high lithium ion conductivity has been reported (see Non-Patent Documents 3 and 4). Furthermore, it is reported that a $Li_{7-3x}Ga_xLa_3Zr_2O_{12}$ single crystal produced by a melting method has higher ionic conductivity than the sintered body.

As the material which achieves high ionic conductivity, it is necessary to reduce grain boundary resistance or interface resistance as much as possible, so that a solid material which is a high-density molded body is desirable. In particular, a high-density molded body which is a single crystal is expected to have high lithium ion conductivity because it is not affected by grain boundaries.

CITATION LIST

Patent Documents

[Patent Document 1]
  Japanese Unexamined Patent Application, First Publication No. 2011-195373
[Patent Document 2]
  PCT International Publication No. WO2016/068040
[Patent Document 3]
  PCT International Publication No. WO2017/130622

Non-Patent Documents

[Non-Patent Document 1]
  Scientific reports, 8, 9965 (2018)
[Non-Patent Document 2]
  Chemelectrochem, 5, 2551 (2018)
[Non-Patent Document 3]
  Chemistry Materials, 28, 1861 to 1871 (2016)
[Non-Patent Document 4]
  Crystallographic Communications, E72, 287 to 289 (2016)
[Non-Patent Document 5]
  Applied Materials Interfaces, 12, 25709 to 25717 (2020)

SUMMARY OF INVENTION

Technical Problem

The present invention has been made in view of the above-described circumstances, and an object of the present invention is to provide a lithium composite oxide single crystal with improved lithium ionic conductivity, a lithium composite oxide polycrystal, a lithium composite oxide material, a solid electrolyte material, an all-solid-state lithium-ion secondary battery, and a method for producing a solid electrolyte material.

Solution to Problem

The present inventors have intensively studied a method of melting at high temperature and then cooling a mixed raw material containing lithium and gallium in excess of a composition ratio of a target solid electrolyte material. As a result, it has been found that it is possible to produce a $Li_{7-3x-w-v}Ga_xLa_3Zr_{2-w-v}Ta_wNb_vO_{12}$ (0.02≤x<0.5, 0≤W≤1.0, 0≤V≤1.0, and 0.05≤W+V≤1.0) single crystal which belongs to a cubic system and has a garnet structure, and it has been confirmed that this single crystal can be mechanically thinned, thereby completing the present invention. In order to solve the above-described problem, the present invention employs the following means.

(1) a lithium composite oxide single crystal according to one aspect of the present invention has a chemical composition represented by $Li_{7-3x-w-v}Ga_xLa_3Zr_{2-w-v}Ta_wNb_vO_{12}$ (0.02≤x<0.5, 0≤W≤1.0, 0≤V≤1.0, and 0.05≤W+V≤1.0), which belongs to a space group I-43d in a cubic system and has a garnet structure.

(2) A lithium composite oxide polycrystal according to one aspect of the present invention has a chemical composition represented by $Li_{7-3x-w-v}Ga_xLa_3Zr_{2-w-v}Ta_wNb_vO_{12}$ (0.02≤x<0.5, 0≤W≤1.0, 0≤V≤1.0, and 0.05≤W+V≤1.0), which belongs to a space group I-43d in a cubic system and has a garnet structure.

(3) In the lithium composite oxide polycrystal according to the above-described aspect, it is preferable that a relative density is 90% or more.

(4) In the lithium composite oxide polycrystal according to the above-described aspect, it is preferable that a relative density is 95% or more.

(5) A lithium composite oxide material according to one aspect of the present invention contains the lithium composite oxide single crystal according to the above-described aspect, or the lithium composite oxide polycrystal according to the above-described aspect.

(6) A solid electrolyte material according to one aspect of the present invention contains the lithium composite oxide single crystal according to the above-described aspect, or the lithium composite oxide polycrystal according to the above-described aspect.

(7) In the solid electrolyte material according to the above-described aspect, it is preferable that a lithium ionic conductivity is $1.0 \times 10^{-3}$ S/cm or more.

(8) An all-solid-state lithium-ion secondary battery according to one aspect of the present invention includes a positive electrode, a negative electrode, and the solid electrolyte material according to the above-described aspect.

(9) A method for producing a solid electrolyte material according to one aspect of the present invention, which is for producing the solid electrolyte material according to the above-described aspect, includes a melted portion forming step of melting at least a part of a rod-shaped base material (first base material) containing a raw material having a chemical composition represented by $Li_{(7-3x-w)y}Ga_{xz}La_3Zr_{2-w}Ta_wNb_vO_{12}$ (0.02≤x<0.5, 1.1≤y≤1.4, 1.6≤z≤3.3, 0≤W≤1.0, 0≤V≤1.0, 0.05≤W+V≤1.0, 1.1≤y≤1.5, and 1.5≤z≤3.5) to form a melted portion; and a melted portion moving step of moving the melted portion at an average speed of 8 mm/h or more.

(10) In the method for producing a solid electrolyte material according to the above-described aspect, it is preferable that the above-described average speed is 8 mm/h or more and 19 mm/h or less.

(11) In the method for producing a solid electrolyte material according to the above-described aspect, it is preferable that, in the above-described melted portion forming step, the above-described base material is rotated together with the above-described melted portion at a rotation speed of 30 rpm or more in a plane perpendicular to a longitudinal direction.

(12) In the method for producing a solid electrolyte material according to the above-described aspect, the above-described melted portion moving step may be performed in a state in which a seed crystal of a solid electrolyte is attached to the above-described melted portion.

(13) In the method for producing a solid electrolyte material according to the above-described aspect, it is preferable that, in above-described the melted portion moving step, the above-described melted portion is rotated at a rotation speed of 2 rpm or more and 8 rpm or less in a plane perpendicular to a longitudinal direction of the above-described base material.

(14) A method for producing a solid electrolyte material according to another aspect of the present invention, which is for producing the solid electrolyte material according to above-described aspect, includes a melt forming step of melting a raw material having a chemical composition represented by $Li_{(7-3x-w)y}Ga_{xz}La_3Zr_{2-w}Ta_wNb_vO_{12}$ (0.02≤x<0.5, 1.1≤y≤1.4, 1.6≤z≤3.3, 0≤W≤1.0, 0≤V≤1.0, 0.05≤W+V≤1.0, 1.1≤y≤1.5, and 1.5≤z≤3.5) in a crucible to form a melt of the raw material; a melt adhesion step of immersing a base material (second base material) in the melt in the crucible and adhering the melt to the base material; and a melt moving step of moving the melt adhered to the base material together with the base material out of the crucible at an average speed of 8 mm/h or more.

(15) In the method for producing a solid electrolyte material according to the above-described aspect, it is preferable that the above-described average speed is 8 mm/h or more and 19 mm/h or less.

(16) In the method for producing a solid electrolyte material according to the above-described aspect, the above-described melt moving step may be performed in a state in which a seed crystal of a solid electrolyte is attached to the above-described base material.

(17) In the method for producing a solid electrolyte material according to the above-described aspect, it is preferable that, in the above-described melt portion moving step, the above-described base material having a rod shape is rotated at a rotation speed of 2 rpm or more and 8 rpm or less in a plane perpendicular to a longitudinal direction with respect to the above-described melt.

Advantageous Effects of Invention

According to the present invention, it is possible to provide a lithium composite oxide single crystal with improved lithium ionic conductivity, a lithium composite oxide polycrystal, a lithium composite oxide material, a solid electrolyte material, an all-solid-state lithium-ion secondary battery, and a method for producing a solid electrolyte material.

DESCRIPTION OF EMBODIMENTS

Figure 1:
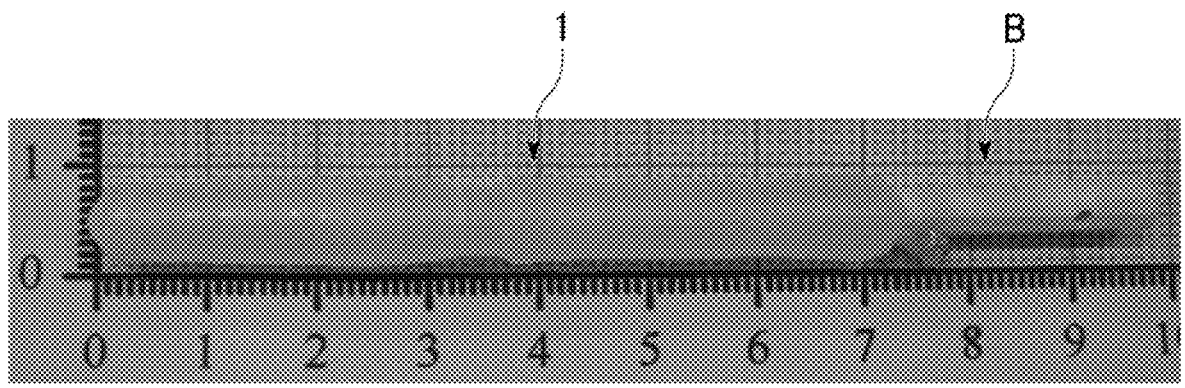
FIG. 1 is a photograph of the appearance of a $Li_6Ga_{0.25}La_3Zr_{1.75}Ta_{0.25}O_{12}$ single crystal grown by an FZ method in Example 1.

Hereinafter, a lithium composite oxide single crystal, a lithium composite oxide polycrystal, a lithium composite oxide material, a solid electrolyte material, an all-solid-state lithium-ion secondary battery, and a method for producing a solid electrolyte material according to embodiments to which the present invention is applied will be described in detail with reference to the drawings. In the drawings used in the following description, in order to make the features easier to understand, a characteristic portion may be enlarged for convenience, and a dimensional ratio or the like of each component may not necessarily be the same as the actual one. In addition, materials, dimensions, and the like mentioned in the following description are examples, and the present invention is not limited thereto and can be implemented with appropriate modifications within the scope of the present invention.

(Solid Electrolyte Material, Lithium Composite Oxide Single Crystal, and Lithium Composite Oxide Polycrystal)

The solid electrolyte material according to one embodiment of the present invention contains at least one of a lithium composite oxide single crystal or a lithium composite oxide polycrystal, each of which has a chemical composition represented by $Li_{7-3x-w-v}Ga_xLa_3Zr_{2-w-v}Ta_wNb_vO_{12}$ ($0.02 \leq x < 0.5$, $0 \leq W \leq 1.0$, $0 \leq V \leq 1.0$, and $0.05 \leq W+V \leq 1.0$).

Here, the solid electrolyte material is a type of a lithium composite oxide material. Applications of the lithium composite oxide material are not limited to use as a solid electrolyte for an all-solid-state battery, and the lithium composite oxide material can be applied to various uses.

The lithium composite oxide single crystal contained in the solid electrolyte material belongs to a space group I-43d in a cubic system, and has a garnet structure. In addition, the lithium composite oxide polycrystal contained in the solid electrolyte material is composed of a single crystal belonging to a space group I-43d in a cubic system and having a garnet structure.

In the present embodiment, a lithium composite oxide having a relative density of 99% or more is regarded as the lithium composite oxide single crystal, and a lithium composite oxide having a relative density of 90% or more and less than 99%, preferably 95% or more and less than 99% is regarded as the lithium composite oxide polycrystal. As the lithium composite oxide single crystal, a volatile material is used in the production process described later, and in a case of producing by a melting method, air may be generated and voids may be generated inside. In such a case, the relative density becomes less than 100%.

The relative density is obtained by measuring an outer shape of a sample (thin piece or the like) of the produced lithium composite oxide, calculating an apparent volume, and dividing an apparent density calculated from the measured mass by a true density obtained from a result of a single crystal X-ray structure analysis. Since the solid electrolyte material according to the present embodiment has a high density, the produced lithium composite oxide can be easily cut into pieces of any thickness using a diamond cutter or the like.

In the solid electrolyte material, the lithium ionic conductivity can be $1.0 \times 10^{-3}$ S/cm or more, and by setting the relative density almost 100%, the lithium ionic conductivity can be $4.0 \times 10^{-3}$ S/cm or more. As the relative density increases, adhesion between particles increases, grain boundaries decrease, and the ionic conductivity can be improved.

(Method for Producing Solid Electrolyte Material)

The method for producing a solid electrolyte material according to the present embodiment mainly includes a step (melted portion forming step) of forming a melted portion of a raw material of the solid electrolyte material and a step (melted portion moving step) of moving the melted portion.

The forming and moving of the melted portion is carried out by any melting method such as a floating zone (FZ) method, a Czochralski (Cz) method, a bridgman method, and a pedestal method, depending on a size, shape, and the like of the crystal to be produced.

[FZ Method]

In a case of producing the solid electrolyte material by the FZ method, the following procedure is adopted as a specific example. First, considering that lithium volatilizes at high temperatures, a lithium compound, a gallium compound, a lanthanum compound, a zirconium compound, a tantalum compound, and a niobium compound are weighed. This weighing is carried out such that, in the final solid electrolyte material, a molar ratio of Li:Ga:La:Zr:Ta:Nb is (7-3x-w-v) y:xz:3:2-w-v:w:v ($0.02 \leq x < 0.5$, $0 \leq W \leq 1.0$, $0 \leq V \leq 1.0$, $0.05 \leq W+V \leq 1.0$, $1.1 \leq y \leq 1.5$, and $1.5 \leq z \leq 3.5$).

The lithium compound is not particularly limited as long as it contains lithium, and oxides such as $Li_2O$, carbonates such as $Li_2CO_3$, and the like are exemplary examples. The gallium compound is not particularly limited as long as it contains gallium, and oxides such as $Ga_2O_3$, nitrates such as Ga(NO$_3$)$_3$, and the like are exemplary examples. The lanthanum compound is not particularly limited as long as it contains lanthanum, and oxides such as La$_2$O$_3$, hydroxides such as La(OH)$_3$, and the like are exemplary examples. The zirconium compound is not particularly limited as long as it contains zirconium, and oxides such as ZrO$_2$, chlorides such as ZrCl$_4$, and the like are exemplary examples. The tantalum compound is not particularly limited as long as it contains tantalum, and oxides such as Ta$_2$O$_5$, chlorides such as TaCl$_5$, and the like are exemplary examples. The niobium compound is not particularly limited as long as it contains niobium, and oxides such as Nb$_2$O$_5$, chlorides such as NbCl$_5$, and the like are exemplary examples.

In addition, using a compound containing lithium, gallium, lanthanum, zirconium, and tantalum or niobium, or a compound including two or more types, the weighing may be carried out such that a molar ratio of Li:Ga:La:Zr:Ta:Nb is (7-3x-w-v)y:xz:3:(2-w-v):w:v (0.02≤x<0.5, 0≤W≤1.0, 0≤V≤1.0, 0.05≤W+V≤1.0, 1.1≤y≤1.5, and 1.5≤z≤3.5). As such a compound including two or more types, lanthanum zirconium oxides such as La$_2$Zr$_2$O$_7$, gallium lanthanum oxides such as GaLaO$_6$, lithium gallium oxides such as Li$_5$GaO$_4$, lithium zirconium oxides such as Li$_2$ZrO$_3$, lanthanum tantalum compounds such as LaTaO$_4$, lanthanum niobium compounds such as LaNbO$_4$, and the like are exemplary examples.

Next, the weighed compounds are mixed with each other. The mixing method is not particularly limited as long as each of these compounds can be uniformly mixed, and for example, a mixing machine such as a mixer may be used for wet or dry mixing. After filling the obtained mixture into a crucible with a lid, the mixture is pre-sintered at 600° C. to 900° C., preferably at 850° C. to obtain a powder as a raw material. It is more preferable to repeat steps of pulverizing, mixing, and sintering the raw material which has been pre-sintered once.

Next, in order to facilitate molding, the obtained raw material powder is pulverized to reduce a particle size. The pulverizing method is not particularly limited as long as the particles can be made finer, and a pulverizing device such as a planetary ball mill, a pot mill, and a beads mill may be used for wet or dry pulverizing. After the pulverized material thus obtained is filled in a rubber tube, the material is hydrostatically pressed and molded into a rod shape.

Next, the obtained rod-shaped molded body is sintered at approximately 700° C. to 1300° C., preferably 800° C. to 1150° C. for approximately 4 hours to obtain a rod-shaped first base material. At this point, the chemical composition of the raw material is Li$_{(7-3x-w-v)y}$Ga$_{xz}$La$_3$Zr$_{2-w}$Ta$_w$Nb$_v$O$_{12}$ (0.02≤x<0.5, 1.1≤y≤1.4, 1.6≤z≤3.3, 0≤W≤1.0, 0≤V≤1.0, and 0.05≤W+V≤1.0). As a result, a rod-shaped first base material can be produced.

The rod-shaped first base material is placed in an infrared condensing heating furnace, and at least a part of the first base material is melted (melted portion forming step). In the melted portion forming step, at least a part of the rod-shaped first base material containing the raw material having a chemical composition represented by Li$_{(7-3x-w-v)y}$Ga$_{xz}$La$_3$Zr$_{2-w}$Ta$_w$Nb$_v$O$_{12}$ (0.02≤x<0.5, 1.1≤y≤1.4, 1.6≤z≤3.3, 0≤W≤1.0, 0≤V≤1.0, and 0.05≤W+V≤1.0) is heated using a predetermined heating means (infrared condensing heating device or the like) to form a melted portion. Here, the melted portion forming step may be performed while rotating the first base material in a plane perpendicular to a longitudinal direction, that is, while rotating the first base material about the longitudinal direction of the first base material.

Subsequently, or together with the melted portion forming step, the raw material with the melted portion formed is moved in the longitudinal direction there of (melted portion moving step). In the melted portion moving step, for example, the raw material having the above-described chemical composition is moved parallel to the longitudinal direction, that is, along the longitudinal direction at an average speed of 8 mm/h or more (preferably, 8 mm/h or more and 19 mm/h or less). From the viewpoint of increasing efficiency of crystal growth of the lithium composite oxide, the melted portion moving step may be performed in a state in which a seed crystal of the solid electrolyte is attached to the melted portion. In this case, the seed crystal also forms a melted portion, and starts to move within several minutes after the melted portion is combined with the melted portion of the raw material. Along with the moving, the melted portion is rapidly cooled.

After the rapid cooling, a solid electrolyte material containing a lithium composite oxide of Li$_{7-3x-w-v}$Ga$_x$La$_3$Zr$_{2-w-v}$Ta$_w$Nb$_v$O$_{12}$ (0.02≤x<0.5, 0≤W≤1.0, 0≤V≤1.0, and 0.05≤W+V≤1.0), which is in a cubic system with a relative density of 90% or more, belongs to a space group I-43d, and has a garnet structure, is obtained. By this producing method, a solid electrolyte material having a length (maximum diameter) of 2 cm or more is obtained, and by cutting the solid electrolyte material into pieces, a plurality of thin pieces of the solid electrolyte material, which have the same quality, can be easily produced.

In the melted portion moving step, the melted portion of the rod-shaped first base material is rotated at a predetermined rotation speed, preferably 30 rpm or more and more preferably 30 rpm or more and 60 rpm or less, in the plane perpendicular to the longitudinal direction. Furthermore, in a case of using the seed crystal, the seed crystal is attached to a tip of the rod-shaped first base material and melted together with the first base material. As a result, a part of the seed crystal becomes the melted portion, and is rotated at the same rotation speed as the melted portion.

In the case of producing by the FZ method, bubbles are generated in the melted portion due to volatilization of highly volatile lithium. Due to the generation of bubbles derived from the raw material during the production process, voids may be generated in the lithium composite oxide single crystal as a finished product. In this case, the relative density is less than 100%. However, by increasing the rotation speed of the rod-shaped raw material (first base material) to 30 rpm or more, the bubbles can be easily removed. Therefore, the relative density of the lithium composite oxide single crystal as a finished product can be increased. In addition, in a case of using the infrared condensing heating device, when the highly volatile gas stagnates, infrared light may be blocked by the highly volatile gas. Therefore, from the viewpoint of efficiently performing the FZ method, it is required to reduce volatile components or to discharge the volatile components out of the apparatus. From this viewpoint, it is preferable that the melted portion forming step and the melted portion moving step are performed in a dry gas atmosphere. As the dry gas, for example, the FZ method can be performed while circulating a gas such as oxygen, nitrogen, argon, and air.

[Cz Method]

In a case of producing the solid electrolyte material by the Cz method, the following procedure is adopted as a specific example. First, in the same procedure as the FZ method, the same raw material as the first base material is melted in a crucible to form a melt of the raw material (melt forming step).

Next, a second base material for growing crystals of the lithium composite oxide is immersed in the melt in the crucible to adhere the melt to the second base material (melt adhesion step). A shape of the second base material here is not particularly limited. Next, together with the second base material, the melt adhered to the second base material is moved (pulled up) out of the crucible at an average speed of 8 mm/h or more (preferably 8 mm/h or more and 19 mm/h or less) (melt moving step). By increasing the pull up speed (moving speed) of the melt to 8 mm/h or more, volatilization of lithium and gallium is suppressed, and a high-density $Li_{7-3x-w-v}Ga_xLa_3Zr_{2-w-v}Ta_wNb_vO_{12}$ (0.02≤x<0.5, 0≤W≤1.0, 0≤V≤1.0, and 0.05≤W+V≤1.0) crystal is obtained.

For example, in a case where the second base material has a rod shape, in the melt portion moving step, by rotating the second base material at a rotation speed of 2 rpm or more and 8 rpm or less in a plane perpendicular to a longitudinal direction with respect to the melt, it is possible to promote growth of crystals of the lithium composite oxide.

In a case where the melt adhesion step is performed in a state in which a seed crystal of the solid electrolyte is attached to the second base material, by adhering the melt to the seed crystal, it is possible to promote the growth of crystals of the lithium composite oxide in the melt moving step.

As described above, the lithium composite oxide $Li_{7-3x-w-v}Ga_xLa_3Zr_{2-w-v}Ta_wNb_vO_{12}$ (0.02≤x<0.5, 0≤W≤1.0, 0≤V≤1.0, and 0.05≤W+V≤1.0) grown by the melting method according to the present embodiment has a different space group from lithium composite oxides synthesized by solid-phase methods in the related art. That is, the lithium composite oxides synthesized by the solid-phase methods belong to a space group of Ia-3d, but the lithium composite oxide grown by the melting method belong to a space group of I-43d.

In addition, the lithium composite oxide grown by the melting method has a crystal structure with a relative density of 90% or more and has few grain boundaries, so that it is excellent in lithium ion conductivity. Therefore, for example, in an all-solid-state lithium-ion secondary battery including a positive electrode, a negative electrode, and a solid electrolyte, a solid electrolyte material containing the lithium composite oxide (lithium composite oxide single crystal or lithium composite oxide polycrystal) according to the present embodiment can be used as the solid electrolyte.

The relative density of the grown lithium composite oxide can be adjusted by changing the production conditions. For example, in the melted portion (melt) forming step, as the heating temperature is higher or as the heating time longer, the relative density can be increased.

EXAMPLES

Hereinafter, the effects of the present invention will be made clearer by Examples. The present invention is not limited to the following examples, and can be implemented with appropriate modifications within the scope of the present invention.

Example 1

The lithium composite oxide single crystal according to the embodiment of the present invention was produced by the following procedure.
(Mixing of Raw Materials of $Li_6Ga_{0.25}La_3Zr_{1.75}Ta_{0.25}O_{12}$)
First, 28.024 g of lithium carbonate $Li_2CO_3$ (manufactured by RARE METALLIC Co., Ltd., purity: 99.99%), 3.385 g of gallium oxide $Ga_2O_3$ (manufactured by RARE METALLIC Co., Ltd., purity: 99.99%), 44.131 g of lanthanum oxide $La_2O_3$ (manufactured by RARE METALLIC Co., Ltd., purity: 99.99%), 19.472 g of zirconium oxide $ZrO_2$ (manufactured by RARE METALLIC Co., Ltd., purity: 99.99%), and 4.988 g of tantalum oxide $Ta_2O_5$ (manufactured by RARE METALLIC Co., Ltd., purity: 99.99%) were placed in an agate mortar, and mixed uniformly by a wet method using ethanol. The lanthanum oxide had been pre-sintered in advance at 900° C. With regard to a molar ratio Li:Ga:La:Zr:Ta of the metals contained in the mixture, with respect to a stoichiometric ratio of $Li_6Ga_{0.25}La_3Zr_{1.75}Ta_{0.25}O_{12}$ as a target product, the amount of lithium was set to 1.4 times the target composition and the amount of gallium was set to 1.6 times the target composition. That is, the chemical composition of the metals contained in the mixture was $Li_{8.4}Ga_{0.4}La_3Zr_{1.75}Ta_{0.25}O_{12}$.

Next, an alumina crucible (manufactured by Nikkato Corporation, C3 model) with a lid was filled with 100 g of the mixture. The crucible was placed in a box-type electric furnace (manufactured by Yamato Scientific Co., Ltd., FP100 model), and pre-sintered at 850° C. for 6 hours to obtain a powder (first powder). Next, the obtained first powder was pulverized. More specifically, 100 g of the first powder, 300 g of zirconia balls having a diameter of 5 mm, and 50 g of isopropanol were packed in a zirconia pulverizing container with a capacity of 250 mL, and using a planetary ball mill (manufactured by Fritsch GmbH, model: P-6), the first powder was pulverized by rotating the container at a revolution speed of 200 rpm for a total of 300 minutes. The pulverized powder (second powder) was dried at 100° C. for 24 hours, and classified using a sieve with 250 μm openings. Hereinafter, the powder which had passed through the sieve with 250 μm openings is referred to as a third powder.
(Production of Rod-Shaped Molded Body)

Using the third powder (raw material) which had passed through the sieve in the above-described step, a rod-shaped molded body (first base material) was produced by the following procedure. First, approximately 34 g of the third powder was filled in cylindrical rubber mold and degassed. Next, the mold was placed in water in a sealed state, and the water pressure was maintained at 40 MPa for 5 minutes. After the water pressure was lowered, the molded body (first molded body) was taken out from the mold. The first molded body has a cylindrical shape with a bottom diameter of approximately 1.0 cm and a height of approximately 12.0 cm. Next, using a box-type electric furnace (manufactured by DENKEN Co., Ltd., model: KDF009), the first cylindrical molded body was sintered at 1150° C. for 4 hours. A second molded body (first base material) which was the molded body after the sintering had a rod shape with a bottom diameter of approximately 0.9 cm and a height of approximately 11 cm.
(Growth of Crystals of $Li_6Ga_{0.25}La_3Zr_{1.75}Ta_{0.25}O_{12}$)

First, in a four-elliptical infrared condensing heating furnace (FZ furnace) manufactured by Crystal Systems Corporation, FZ-T-10000H model) equipped with a 1 kW halogen lamp, the rod-shaped molded body obtained in the above-described step was placed, and the interior space was made into a dry air atmosphere. Next, while rotating, at a rotation speed of 40 rpm, the rod-shaped second molded body in a plane perpendicular to a longitudinal direction, that is, about a direction in which the second molded body extended, heating was performed at an output of 24.4% around the extending direction of the second molded body. After a while, a part of the second molded body (first base material) which was a polycrystalline sample melted to form a melted portion. While maintaining the heating of the first base material, a mounting table of the rod-shaped second molded body was moved down along the longitudinal direction at a moving speed of 10 mm/h to grow a high-density $Li_6Ga_{0.25}La_3Zr_{1.85}Ta_{0.25}O_{12}$ crystal (hereinafter, may be referred to as "sample 1").

The chemical composition of the grown sample 1 was analyzed by ICP-AES and a single crystal X-ray crystallography. As a result of the analysis, the chemical composition of ICP-AES was Li:Ga:La:Zr:Ta=6.0:0.25:3.0:1.75:0.25. FIG. 1 is a photograph of the appearance of the sample 1 grown along the longitudinal direction of a first base material B. As shown in FIG. 1, the length of the sample 1 was approximately 7 cm.

(Evaluation of High-Density $Li_6Ga_{0.25}La_3Zr_{1.75}Ta_{0.25}O_{12}$ Crystal)

Figure 2:
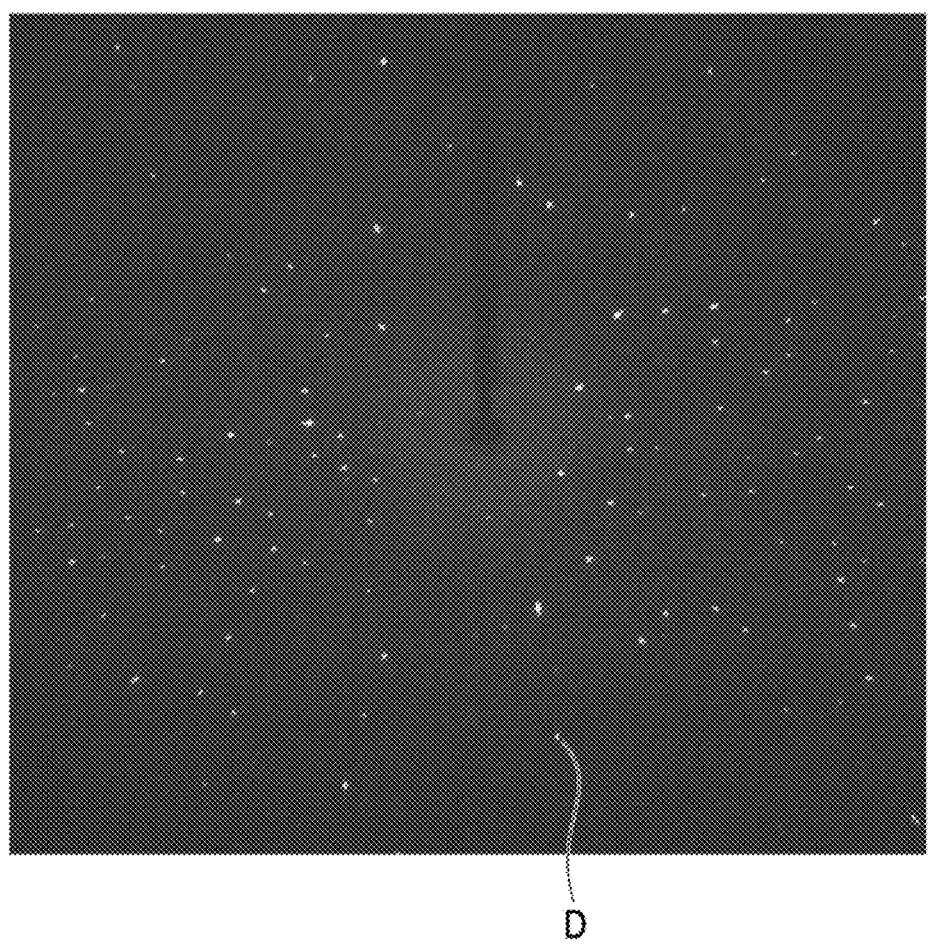
FIG. 2 is a single crystal X-ray diffraction pattern obtained with the $Li_6Ga_{0.25}La_3Zr_{1.75}Ta_{0.25}O_{12}$ single crystal of FIG. 1.

Using a single crystal X-ray diffractometer (manufactured by Rigaku Corporation, R-AXIS RAPID-II) having a two-dimensional IP detector, a structure of the sample 1 was investigated. FIG. 2 is an image showing the X-ray diffraction pattern obtained for the sample 1, and from this image, a diffraction point D unique to the single crystal structure could be clearly confirmed.

In a case where diffraction intensity data of the sample 1 was collected and the crystal structure was examined by a crystal structure analysis program Jana2006, it was found that the sample 1 belonged to a space group I-43d in a cubic crystal. Using a diamond cutter, four thin pieces having a thickness of 0.1 cm were produced (cut out) from the sample 1, and the relative densities of these pieces were calculated by the method described above. As a result, the relative densities were 99.8%, 99.9%, 100%, and 100%, respectively.

Figure 3:
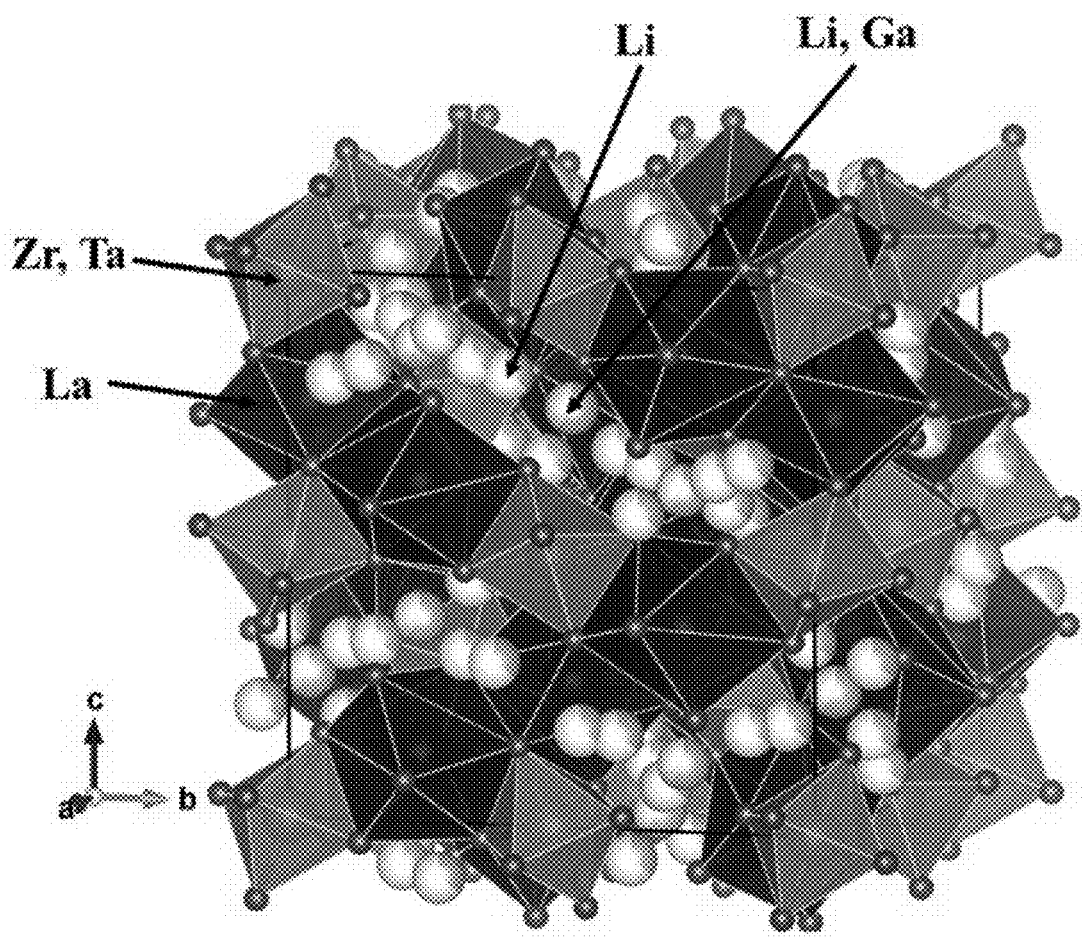
FIG. 3 is a schematic diagram showing a garnet structure of the $Li_6Ga_{0.25}La_3Zr_{1.75}Ta_{0.25}O_{12}$ single crystal of FIG. 1.

FIG. 3 schematically shows the structure of the sample 1. $Li_{7-3x-y}Ga_xLa_3Zr_{2-y}Nb_yO_{12}$ having a cubic garnet structure, which has been produced by sintering a polycrystal as a raw material for lithium composite oxide by a generally known method for producing a solid electrolyte, belongs to a space group of Ia-3d (for example, Non-Patent Document 5). On the other hand, the sample 1 grown by the melting method according to the above-described embodiment belonged to the space group of I-43d; and in the crystal structure, lanthanum occupied a site 24c (coordinate x=0.25, y=0.125, Z=0), zirconium and tantalum occupied a site 16a (x=0, y=0, z=0), a site 12a (coordinate x=0.75, y=0.625, z=0), a site 12b (coordinate x=0.75, y=0.125, z=0), and two types of sites 48e (coordinate x=0.6803, y=0.5651, z=0.1452, and coordinate x=0.6905, y=0.5895, z=0.0818) were sites of lithium, and the sites 12a and 12b were sites of gallium. Thus, the sample 1 obtained in the case of producing by the melting method had a clearly different space group from the crystal produced by the sintering method as disclosed in Non-Patent Document 5, and it was found that the sample 1 was a novel substance having a different crystal structure. Since R factor indicating a reliability of the crystal structure analysis here was 2.33%, it could be judged that the result of the crystal structure analysis was appropriate.

In the sample 1 which had a gallium-substituted cubic garnet structure, a distance between aligned lithium ions was the shortest, and the sites of lithium ion were moderately deficient. Therefore, it is considered that the lithium ionic conductivity of the sample 1 was higher than that of other cubic garnet structure compounds. The sample 1 was cut to produce a cylindrical (bottom diameter of approximately 0.50 cm and a thickness of approximately 0.20 cm) thin piece. Gold was sputtered on two bottom surfaces (front side and back side) of the thin piece to form a cylindrical electrode (bottom diameter of 0.40 cm and a thickness of 40 nm).

Figure 4:
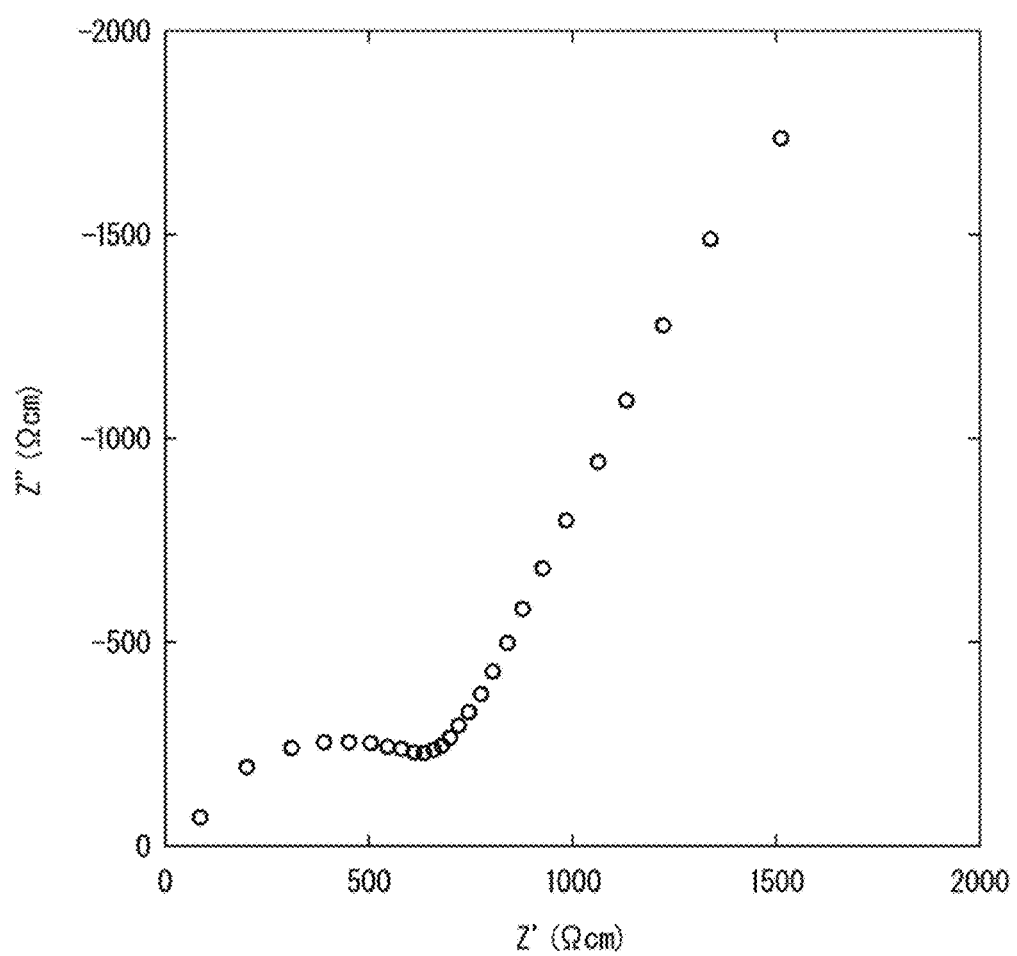
FIG. 4 is a Nyquist plot of the $Li_6Ga_{0.25}La_3Zr_{1.75}Ta_{0.25}O_{12}$ single crystal of FIG. 1, obtained by an AC impedance method.

The impedance of the sample 1 was measured for each AC frequency at 25° C. in a nitrogen atmosphere by an AC impedance method (measurement device: Solarton, 1260). FIG. 4 is a graph of a Nyquist plot obtained from the measurement results. The horizontal axis of the graph indicates a real part Z' (Ωcm) of the impedance, and the vertical axis of the graph indicates an imaginary part Z" (Ωcm) of the impedance. From the graph, the lithium ionic conductivity was calculated to be $4.62 \times 10^{-3}$ S/cm.

Figure 5:
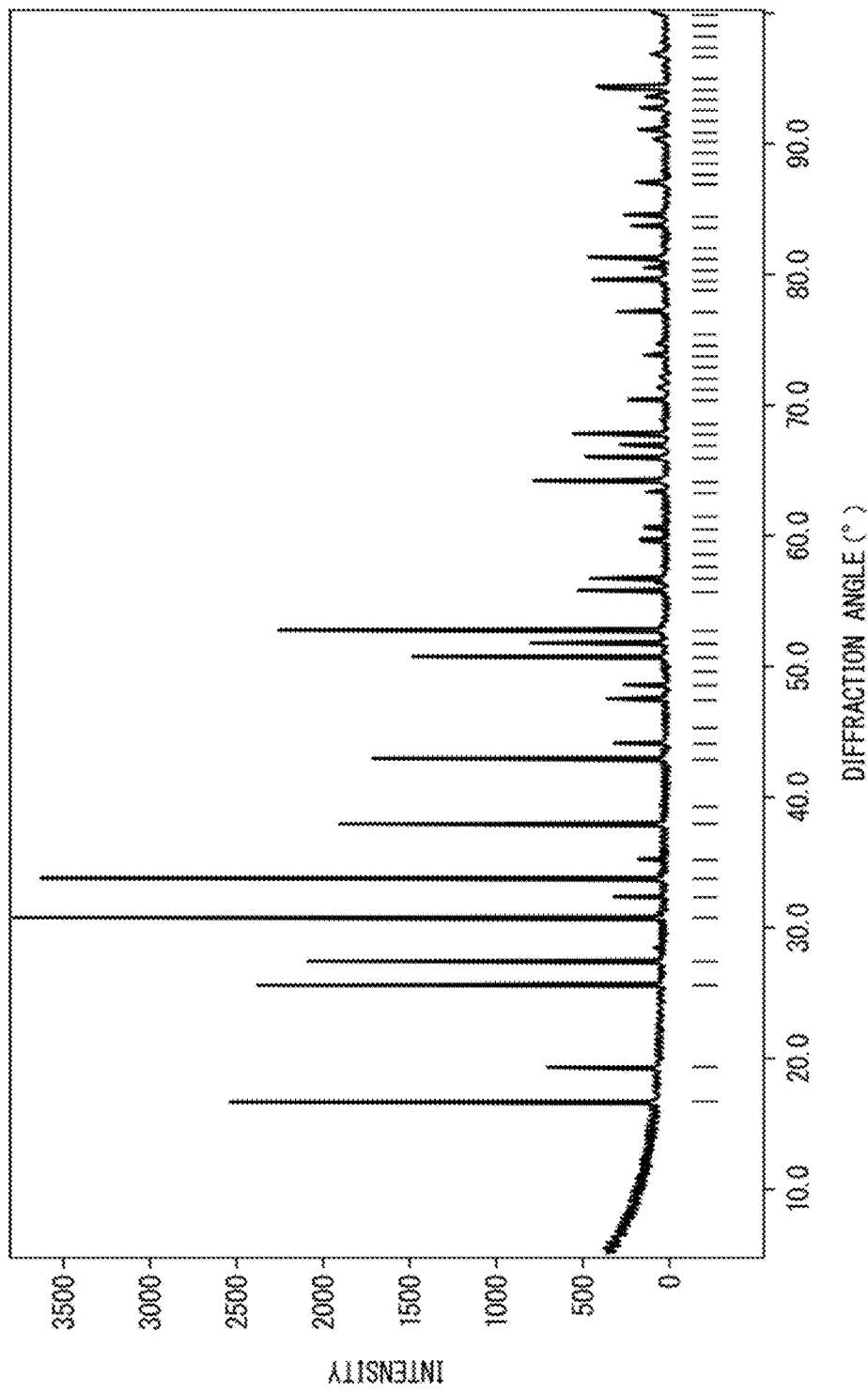
FIG. 5 is a powder X-ray diffraction pattern obtained with the $Li_6Ga_{0.25}La_3Zr_{1.75}Ta_{0.25}O_{12}$ single crystal of FIG. 1.

In a case where a lattice constant a was determined by a least-squares method using the reflection observed in the single crystal X-ray diffraction measurement of the sample 1, a was 1.29646 nm±0.00003 nm. From the lattice constant, it was found that the sample 1 was a lithium composite oxide having a garnet structure. FIG. 5 shows a powder X-ray diffraction pattern obtained as a result of pulverizing the sample 1 and performing a powder X-ray diffraction measurement. The powder X-ray diffraction pattern of the sample 1 was similar to that of a single phase having a cubic garnet structure. A lattice constant a calculated from the result of the powder X-ray structure analysis was a=1.29691 nm±0.00001 nm. By combining the result of the single crystal X-ray diffraction measurement and the result of the powder X-ray structure analysis, it was found that the lattice constant of the sample 1 was 1.29646 nm≤a≤1.29691 nm.

Example 2

(Production of all-Solid-State Lithium-Ion Secondary Battery)

An all-solid-state lithium-ion secondary battery including the sample 1 obtained in Example 1 as a solid electrolyte material was produced by the following procedure.

First, 0.0105 mol of lithium acetate dihydrate (manufactured by Sigma-Aldrich Inc.) and 0.01 mol of cobalt acetate tetrahydrate (manufactured by Wako Pure Chemical Corporation) were dissolved in 100 g of ethylene glycol (manufactured by Wako Pure Chemical Corporation). 10 g of polyvinylpyrrolidone K-30 (manufactured by Wako Pure Chemical Corporation) was further added thereto and dissolved to prepare a 0.1 mol/Kg lithium cobalt oxide precursor solution. The reason why the amount of lithium acetate was increased by 5% in terms of molar ratio over the amount of cobalt acetate is that the amount of lithium evaporated during sintering was taken into consideration.

Next, the sample 1 was cut to produce a cylindrical thin piece having a bottom diameter of approximately 0.6 cm and a thickness of approximately 0.10 cm, and 10 µl of the above-described solution was dropped on the thin piece and temporarily heated at 400° C. for 20 minutes for pre-sintering. Thereafter, sintering was performed at 850° C. for 10 minutes to obtain an all-solid-state lithium-ion secondary battery (hereinafter, may be referred to as "sample 2") in which lithium cobalt oxide was synthesized to a main surface of the sample 1 as a positive electrode and metallic lithium was attached to a back surface of the sample 1 as a negative electrode.

Figure 6:
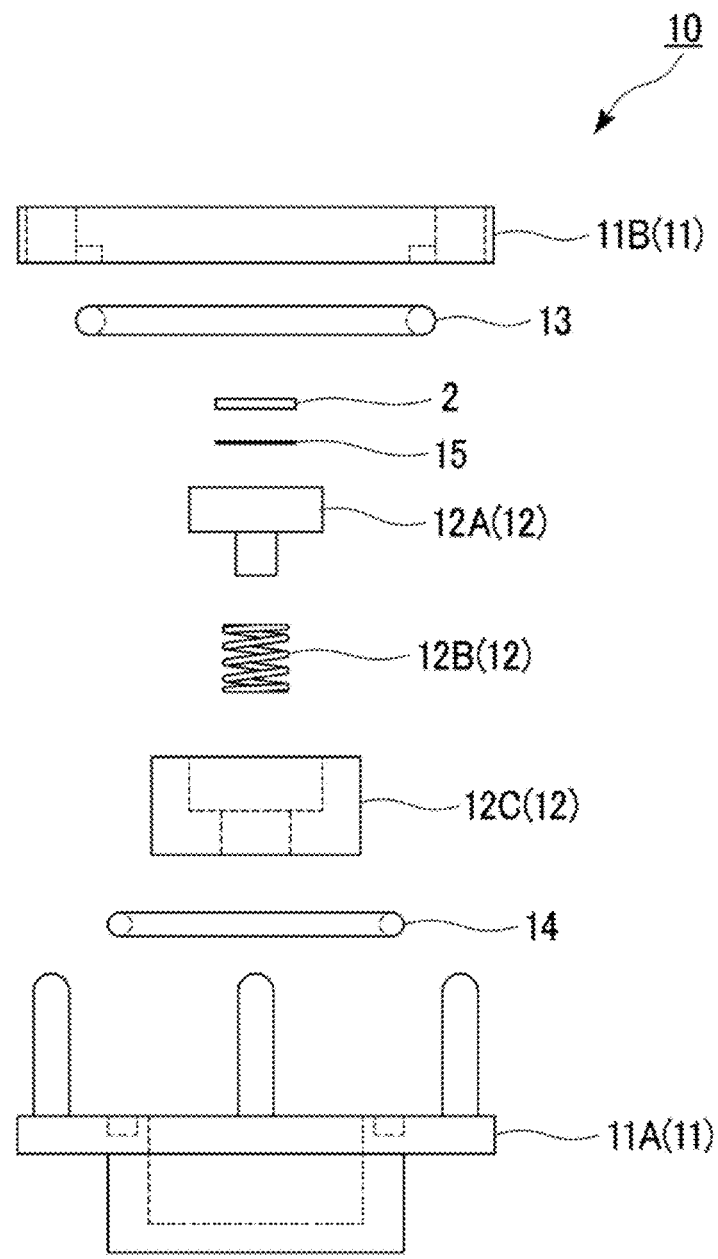
FIG. 6 is a schematic diagram of an evaluation device for an all-solid-state lithium-ion secondary battery produced using $Li_6Ga_{0.25}La_3Zr_{1.75}Ta_{0.25}O_{12}$ of FIG. 1.

FIG. 6 is a diagram schematically showing a configuration of an evaluation device 10 for the sample 2. Here, for the sake of explanation, each component of the evaluation device 10 is shown disassembled. The evaluation device 10 is mainly composed of a cell 11 for battery evaluation and a support means 12 for the sample 2 placed therein. The cell 11 for battery evaluation is composed of an evaluation cell body 11A which accommodates and supports the support means 12 and an evaluation cell lid 11B which covers a side opposite to the evaluation cell body 11A side. The evaluation cell body 11A and the evaluation cell lid 11B are connected through a silicon rubber O-ring 13 and a fluororesin O-ring 14 to fix the sample 1. The support means 12 is composed of a base 12A on which the sample 1 is placed with a metal lithium plate (negative electrode) 15, a spring 12B for adjusting the height of the base 12A, and a guide 12C for spring for fixing the spring 12B.

In the evaluation device 10, the voltage was measured for the sample 2 which was obtained by bonding the positive electrode and the negative electrode using the sample 1 as the solid electrolyte material. Specifically, in a case where, in a glove box, the sample 2 and the disc-shaped metal lithium plate (diameter of 4 mm and thickness of 1 mm) 15 were placed in a commercially available HS cell 11 for battery evaluation (manufactured by Hohsen Corp.), and the voltage was measured, the open circuit voltage was 2.9 V. As a result, it was confirmed that the sample 2 functioned as a battery.

Example 3

Example 3 differs from Example 1 in that a sample containing niobium but not containing tantalum was formed, and in the mixing ratio of the raw materials.
(Mixing of Raw Materials of $Li_6Ga_{0.25}La_3Zr_{1.75}Nb_{0.25}O_{12}$)

First, 28.5922 g of lithium carbonate $Li_2CO_3$ (manufactured by RARE METALLIC Co., Ltd., purity: 99.99%), 3.4539 g of gallium oxide $Ga_2O_3$ (manufactured by RARE METALLIC Co., Ltd., purity: 99.99%), 45.0257 g of lanthanum oxide $La_2O_3$ (manufactured by RARE METALLIC Co., Ltd., purity: 99.99%), 19.8671 g of zirconium oxide $ZrO_2$ (manufactured by RARE METALLIC Co., Ltd., purity: 99.99%), and 3.0612 g of niobium oxide $Nb_2O_5$ (manufactured by RARE METALLIC Co., Ltd., purity: 99.99%) were placed in an agate mortar, and mixed uniformly by a wet method using ethanol. The lanthanum oxide had been pre-sintered in advance at 900° C. With regard to a molar ratio Li:Ga:La:Zr:Ta of the metals contained in the mixture, with respect to a stoichiometric ratio of $Li_6Ga_{0.25}La_3Zr_{1.75}Nb_{0.25}O_{12}$ as a target product, the amount of lithium was set to 1.4 times the target composition and the amount of gallium was set to 1.6 times the target composition. That is, the chemical composition of the metals contained in the mixture was $Li_{8.4}Ga_{0.4}La_3Zr_{1.75}Nb_{0.25}O_{12}$.

Subsequently, the above-described mixture was used to grow, by the same method as the method for growing the sample 1 using the mixture in Example 1, a sample 3 as a high-density $Li_6Ga_{0.25}La_3Zr_{1.75}Nb_{0.25}O_{12}$ crystal.

Figure 7:
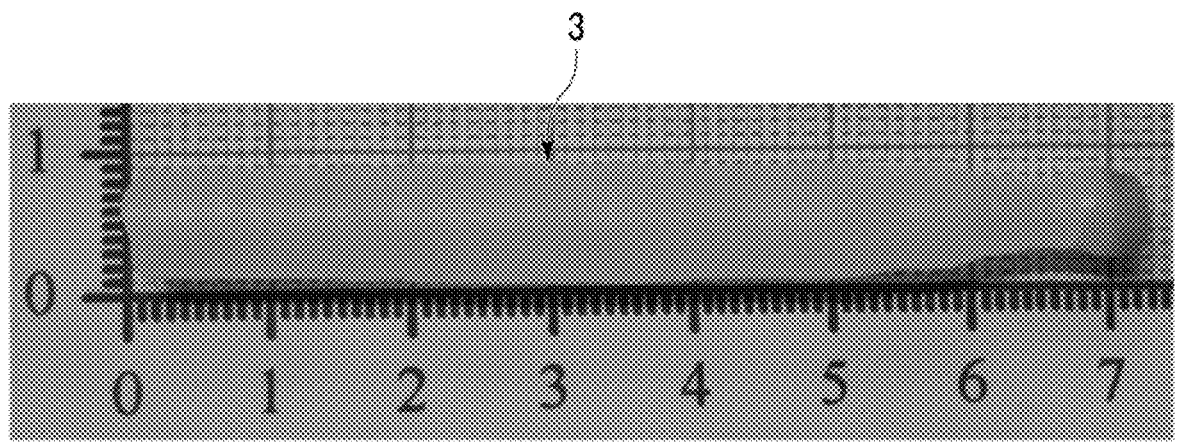
FIG. 7 is a photograph of the appearance of a $Li_6Ga_{0.25}La_3Zr_{1.75}Nb_{0.25}O_{12}$ crystal grown by an FZ method in Example 3.

The chemical composition of the grown sample 3 was analyzed in the same manner as in Example 1. As a result of the analysis, the chemical composition of ICP-AES was Li:Ga:La:Zr:Nb=6.0:0.25:3.0:1.75:0.25. FIG. 7 is a photograph of the appearance of the sample 3. As shown in FIG. 7, the length of the sample 3 was approximately 7 cm.
(Evaluation of High-Density $Li_6Ga_{0.25}La_3Zr_{1.75}Nb_{0.25}O_{12}$ Crystal)

Figure 8:
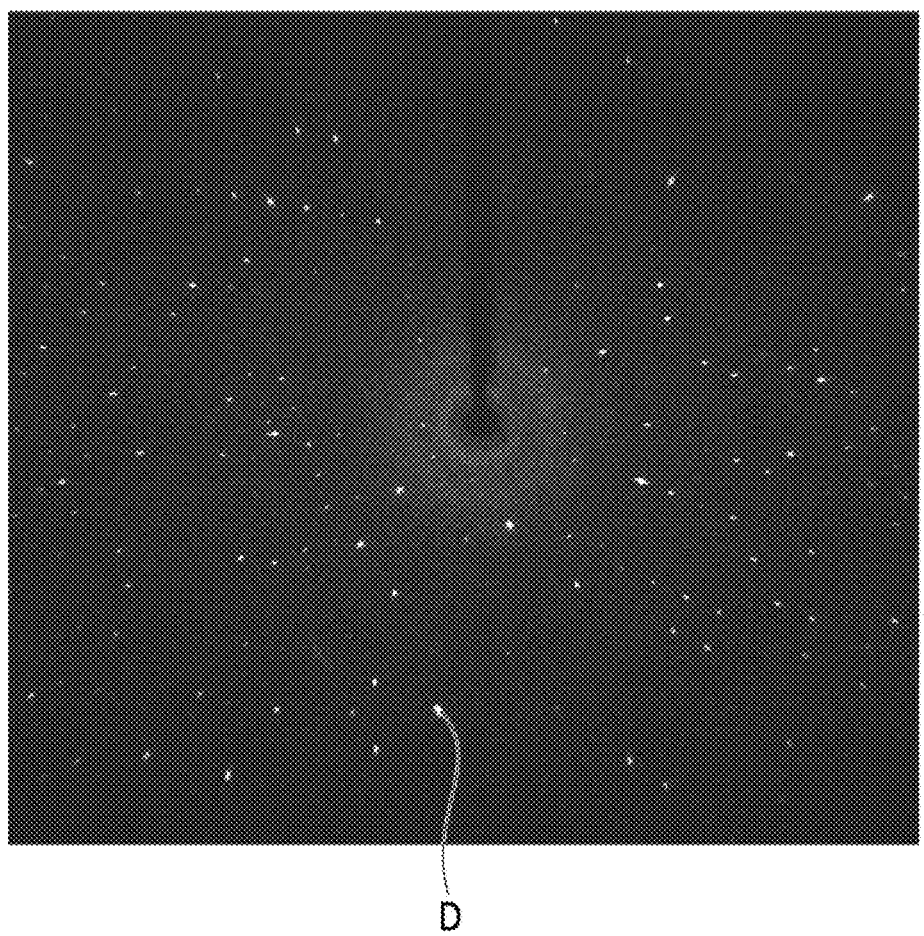
FIG. 8 is a single crystal X-ray diffraction pattern obtained with the $Li_6Ga_{0.25}La_3Zr_{1.75}Nb_{0.25}O_{12}$ single crystal of FIG. 7.

The structure of the sample 3 was investigated in the same manner as in Example 1. FIG. 8 is an image showing the X-ray diffraction pattern obtained for the sample 3, and from this image, a diffraction point D unique to the single crystal structure could be clearly confirmed.

In a case where diffraction intensity data of the sample 3 was collected and the crystal structure was examined in the same manner as in Example 1, it was found that the sample 3 belonged to a space group I-43d in a cubic crystal. Using a diamond cutter, four thin pieces having a thickness of 0.1 cm were produced (cut out) from the sample 3, and relative densities of these pieces were calculated by the method described above. As a result, the relative densities were each 99.7%, 99.8%, 100%, and 100%.

Figure 9:
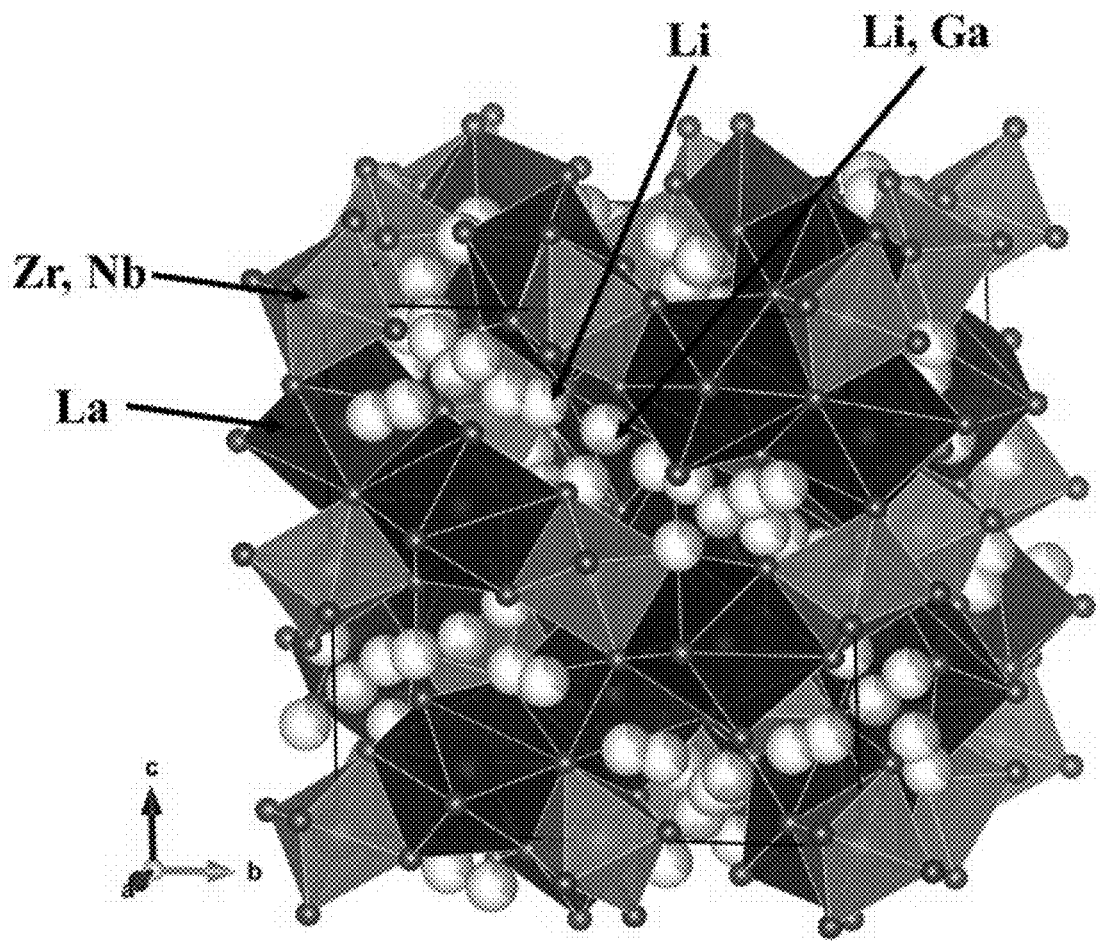
FIG. 9 is a schematic diagram showing a garnet structure of the $Li_6Ga_{0.25}La_3Zr_{1.75}Nb_{0.25}O_{12}$ single crystal of FIG. 7.

FIG. 9 schematically shows the structure of the sample 3. $Li_{7-3x-y}Ga_xLa_3Zr_{2-y}Nb_yO_{12}$ having a cubic garnet structure, which has been produced by sintering a polycrystal as a raw material for lithium composite oxide by a generally known method for producing a solid electrolyte, belongs to a space group of Ia-3d same as $Li_{7-3x-y}Ga_xLa_3Zr_{2-y}Ta_yO_{12}$ as an analogous compound (for example, Non-Patent Document 5). On the other hand, the sample 3 grown by the melting method according to the above-described embodiment belonged to the space group of I-43d; and in the crystal structure, lanthanum occupied a site 24c (coordinate x=0.25, y=0.125, Z=0), zirconium and niobium occupied a site 16a (x=0, y=0, z=0), a site 12a (coordinate x=0.75, y=0.625, z=0), a site 12b (coordinate x=0.75, y=0.125, z=0), and two types of sites 48e (coordinate x=0.6801, y=0.5648, z=0.1454, and coordinate x=0.6902, y=0.5890, z=0.0822) were sites of lithium, and the sites 12a and 12b were sites of gallium. Thus, the sample 3 obtained in the case of producing by the melting method had a clearly different space group from the crystal produced by the sintering method as disclosed in Non-Patent Document 5, and it was found that the sample 3 was a novel substance having a different crystal structure. Since R factor indicating a reliability of the crystal structure analysis here was 2.13%, it could be judged that the result of the crystal structure analysis was appropriate.

Example 4

Example 4 differs from Example 1 in that a sample containing niobium was formed, and in the mixing ratio of the raw materials.
(Mixing of Raw Materials of $Li_6Ga_{0.25}La_3Zr_{1.75}Ta_{0.125}Nb_{0.125}O_{12}$)

First, 28.3052 g of lithium carbonate $Li_2CO_3$ (manufactured by RARE METALLIC Co., Ltd., purity: 99.99%), 3.4192 g of gallium oxide $Ga_2O_3$ (manufactured by RARE METALLIC Co., Ltd., purity: 99.99%), 44.5737 g of lanthanum oxide $La_2O_3$ (manufactured by RARE METALLIC Co., Ltd., purity: 99.99%), 19.6677 g of zirconium oxide $ZrO_2$ (manufactured by RARE METALLIC Co., Ltd., purity: 99.99%), 2.5190 g of tantalum oxide $Ta_2O_5$ (manufactured by RARE METALLIC Co., Ltd., purity: 99.99%), and 1.5152 g of niobium oxide $Nb_2O_5$ (manufactured by RARE METALLIC Co., Ltd., purity: 99.99%) were placed in an agate mortar, and mixed uniformly by a wet method using ethanol. The lanthanum oxide had been pre-sintered in advance at 900° C. With regard to a molar ratio Li:Ga:La:Zr:Ta of the metals contained in the mixture, with respect to a stoichiometric ratio of $Li_6Ga_{0.25}La_3Zr_{1.75}Ta_{0.125}Nb_{0.125}O_{12}$ as a target product, the amount of lithium was set to 1.4 times the target composition and the amount of gallium was set to 1.6 times the target composition. That is, the chemical composition of the metals contained in the mixture was $Li_{8.4}Ga_{0.4}La_3Zr_{1.75}Ta_{0.125}Nb_{0.125}O_{12}$.

Subsequently, the above-described mixture was used to grow, by the same method as the method for growing the sample 1 using the mixture in Example 1, a sample 4 as a high-density $Li_6Ga_{0.25}La_3Zr_{1.75}Ta_{0.25}O_{12}$ crystal.

Figure 10:
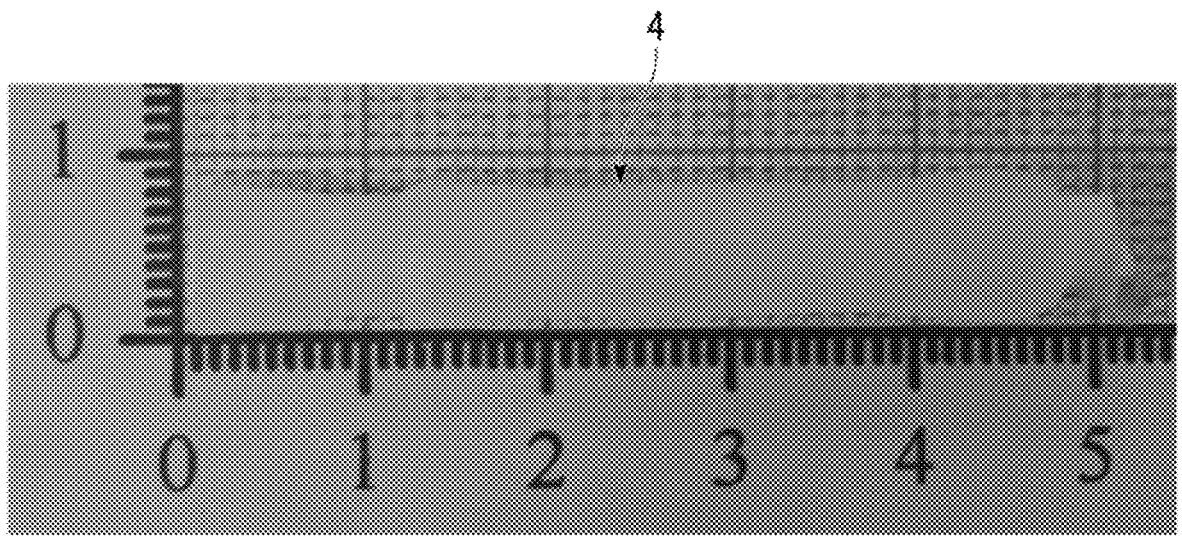
FIG. 10 is a photograph of the appearance of a $Li_6Ga_{0.25}La_3Zr_{1.75}Ta_{0.125}Nb_{0.125}O_{12}$ crystal grown by an FZ method in Example 4.

The chemical composition of the grown sample 4 was analyzed in the same manner as in Example 1. As a result of the analysis, the chemical composition of ICP-AES was Li:Ga:La:Zr:Ta:Nb=6.0:0.25:3.0:1.75:0.125:0.125. FIG. 10 is a photograph of the appearance of the sample 4. As shown in FIG. 10, the length of the sample 10 was approximately 5 cm.

(Evaluation of High-Density $Li_6Ga_{0.25}La_3Zr_{1.75}Ta_{0.125}Nb_{0.125}O_{12}$ Crystal)

Figure 11:
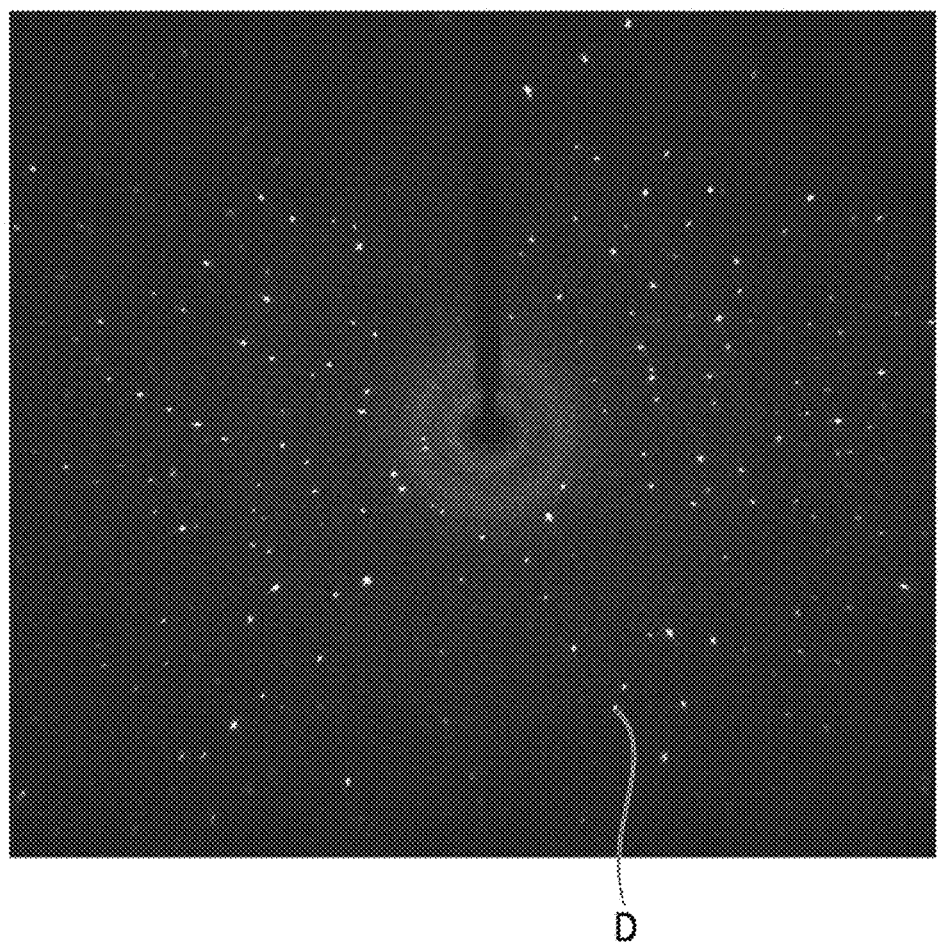
FIG. 11 is a single crystal X-ray diffraction pattern obtained with the $Li_6Ga_{0.25}La_3Zr_{1.75}Ta_{0.125}Nb_{0.125}O_{12}$ single crystal of FIG. 10.

The structure of the sample 4 was investigated in the same manner as in Example 1. FIG. 11 is an image showing the X-ray diffraction pattern obtained for the sample 4, and from this image, a diffraction point D unique to the single crystal structure could be clearly confirmed.

In a case where diffraction intensity data of the sample 4 was collected and the crystal structure was examined in the same manner as in Example 1, it was found that the sample 4 belonged to a space group I-43d in a cubic crystal. Using a diamond cutter, four thin pieces having a thickness of 0.1 cm were produced (cut out) from the sample 4, and relative densities of these pieces were calculated by the method described above. As a result, the relative densities were each 99.8%, 100%, 100%, and 100%.

Figure 12:
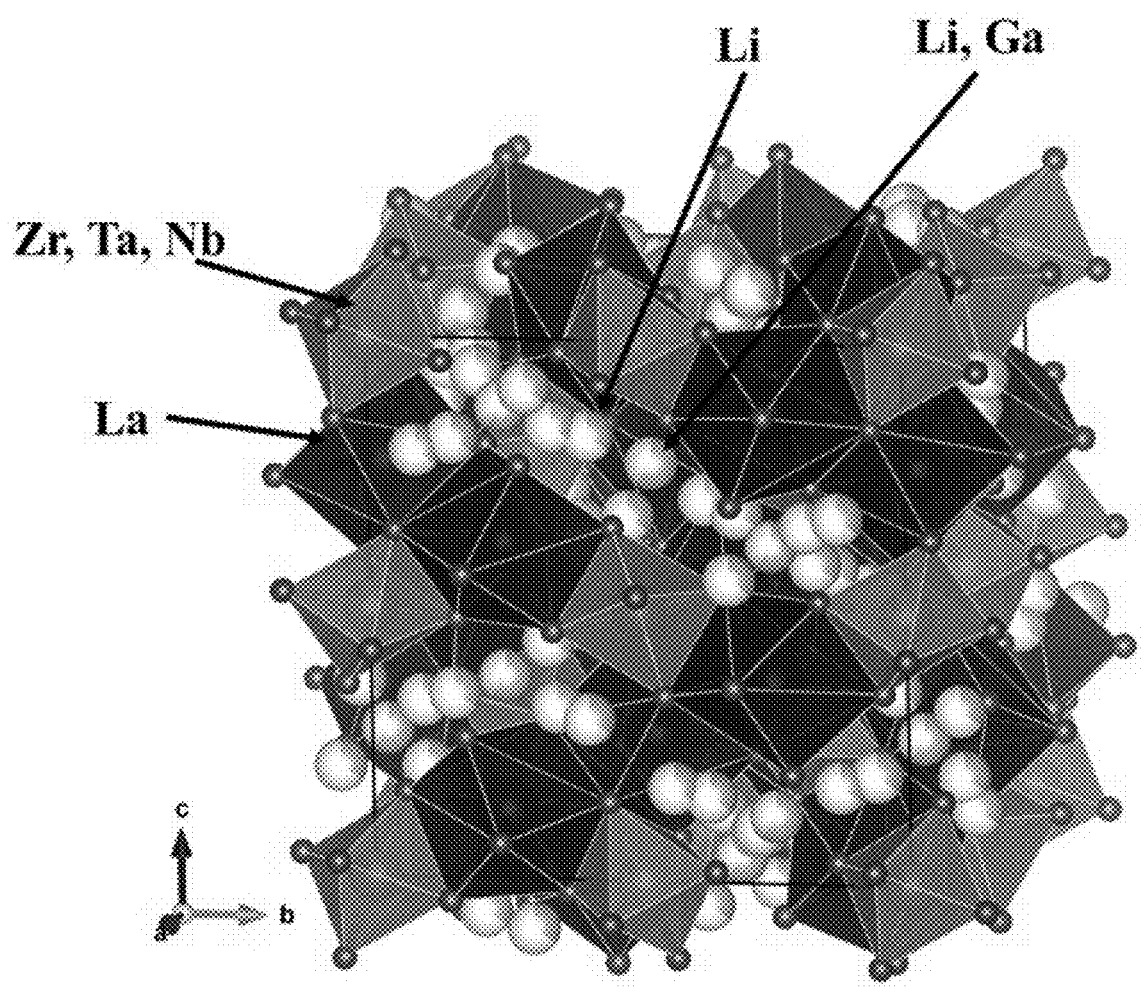
FIG. 12 is a schematic diagram showing a garnet structure of the $Li_6Ga_{0.25}La_3Zr_{1.75}Ta_{0.125}Nb_{0.125}O_{12}$ single crystal of FIG. 11.

FIG. 12 schematically shows the structure of the sample 4. $Li_{7-3x-w-y}Ga_xLa_3Zr_{2-w-y}Ta_wNb_yO_{12}$ having a cubic garnet structure, which has been produced by sintering a polycrystal as a raw material for lithium composite oxide by a generally known method for producing a solid electrolyte, belongs to a space group of Ia-3d same as $Li_{7-3x-y}Ga_xLa_3Zr_{2-y}Ta_yO_{12}$ as an analogous compound (for example, Non-Patent Document 5). On the other hand, the sample 4 grown by the melting method according to the above-described embodiment belonged to the space group of I-43d; and in the crystal structure, lanthanum occupied a site 24c (coordinate x=0.25, y=0.125, Z=0), zirconium and niobium occupied a site 16a (x=0, y=0, z=0), a site 12a (coordinate x=0.75, y=0.625, z=0), a site 12b (coordinate x=0.75, y=0.125, z=0), and two types of sites 48e (coordinate x=0.6805, y=0.5652, z=0.1448, and coordinate x=0.6900, y=0.5885, z=0.0818) were sites of lithium, and the sites 12a and 12b were sites of gallium. Thus, the sample 4 obtained in the case of producing by the melting method had a clearly different space group from the crystal produced by the sintering method as disclosed in Non-Patent Document 5, and it was found that the sample 4 was a novel substance having a different crystal structure. Since R factor indicating the reliability of the crystal structure analysis here was 1.88%, it could be judged that the result of the crystal structure analysis was appropriate.

Example 5

Example 5 differs from Example 1 in that a sample containing niobium was formed, in the mixing ratio of the raw materials, and in that the crystal was grown using the Cz method.

(Mixing of Raw Materials of $Li_{6.125}Ga_{0.125}La_3Zr_{1.5}Ta_{0.25}Nb_{0.25}O_{12}$)

First, 28.8647 g of lithium carbonate $Li_2CO_3$ (manufactured by RARE METALLIC Co., Ltd., purity: 99.99%), 1.7078 g of gallium oxide $Ga_2O_3$ (manufactured by RARE METALLIC Co., Ltd., purity: 99.99%), 44.5271 g of lanthanum oxide $La_2O_3$ (manufactured by RARE METALLIC Co., Ltd., purity: 99.99%), 16.8408 g of zirconium oxide $ZrO_2$ (manufactured by RARE METALLIC Co., Ltd., purity: 99.99%), 5.0327 g of tantalum oxide $Ta_2O_5$ (manufactured by RARE METALLIC Co., Ltd., purity: 99.99%), and 3.0273 g of niobium oxide $Nb_2O_5$ (manufactured by RARE METALLIC Co., Ltd., purity: 99.99%) were placed in an agate mortar, and mixed uniformly by a wet method using ethanol. The lanthanum oxide had been pre-sintered in advance at 900° C. With regard to a molar ratio Li:Ga:La: Zr:Ta of the metals contained in the mixture, with respect to a stoichiometric ratio of $Li_{6.125}Ga_{0.125}La_3ZrTa_{0.25}Nb_{0.25}O_{12}$ as a target product, the amount of lithium was set to 1.4 times the target composition and the amount of gallium was set to 1.6 times the target composition. That is, the chemical composition of the metals contained in the mixture was $Li_{5.55}Ga_{0.2}La_3Zr_{1.5}Ta_{0.25}Nb_{0.25}O_{12}$.

Subsequently, a rod-shaped molded body was produced using the above-described mixture in the same manner as the method for producing the rod-shaped molded body in Example 1.

(Growth of $Li_{6.125}Ga_{0.125}La_3Zr_{1.5}Ta_{0.25}Nb_{0.25}O_{12}$ Crystal)

After producing the rod-shaped molded body by sintering, first, the rod-shaped molded body after sintering was cut into an appropriate size, and filled in an iridium crucible having an outer diameter of 30 mm, an inner diameter of 28 mm, and a depth of 30 mm. Thereafter, the iridium crucible was placed in a center of a high-frequency induction heating coil portion of a single crystal pulling furnace (Cz furnace) (manufactured by Techno Search, Inc., TCH-3 model). Next, the molded body after sintering in the iridium crucible was heated until it melted. An iridium rod serving as a second base material, which had previously been placed in an upper part of the Cz furnace, was immersed in the melt to adhere the melt to the iridium rod, the iridium rod was rotated at a rotation speed of 5 rpm in a plane perpendicular to a longitudinal direction, that is, about the longitudinal direction of the iridium rod, and the iridium rod to which the melt adhered was moved at a moving speed of 8 mm/h and lifted out of the crucible in a direction away from the melt in the crucible to grow a high-density $Li_{6.125}Ga_{0.125}La_3Zr_{1.5}Ta_{0.25}Nb_{0.25}O_{12}$ crystal (hereinafter, may be referred to as "sample 5").

Figure 13:
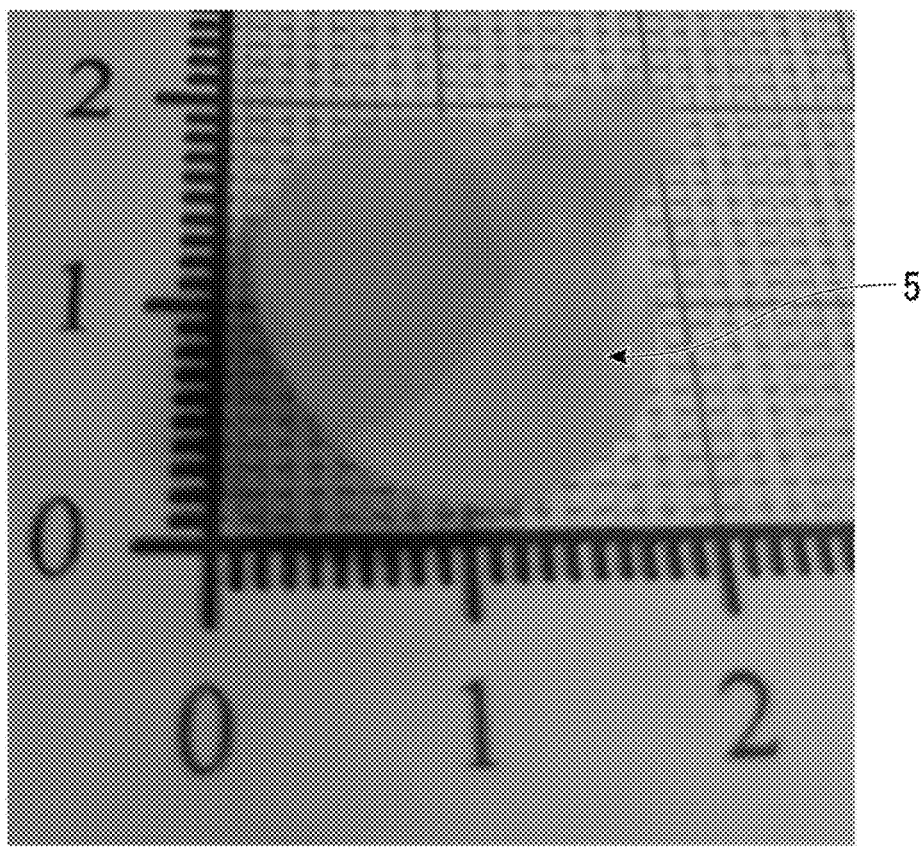
FIG. 13 is a photograph of the appearance of a $Li_{6.125}Ga_{0.125}La_3Zr_{1.5}Ta_{0.25}Nb_{0.25}O_{12}$ crystal grown by a Cz method in Example 5.

The chemical composition of the grown sample 5 was analyzed in the same manner as in Example 1. As a result of the analysis, the chemical composition of ICP-AES was Li:Ga:La:Zr:Ta:Nb=6.1:0.125:3.0:1.5:0.25:0.25. FIG. 13 is a photograph of the appearance of the sample 5. As shown in FIG. 13, the sample 5 had a diameter of approximately 20 mm and a length of approximately 20 mm.

(Evaluation of High-Density $Li_{6.125}Ga_{0.125}La_3Zr_{1.5}Ta_{0.25}Nb_{0.25}O_{12}$ Crystal)

Figure 14:
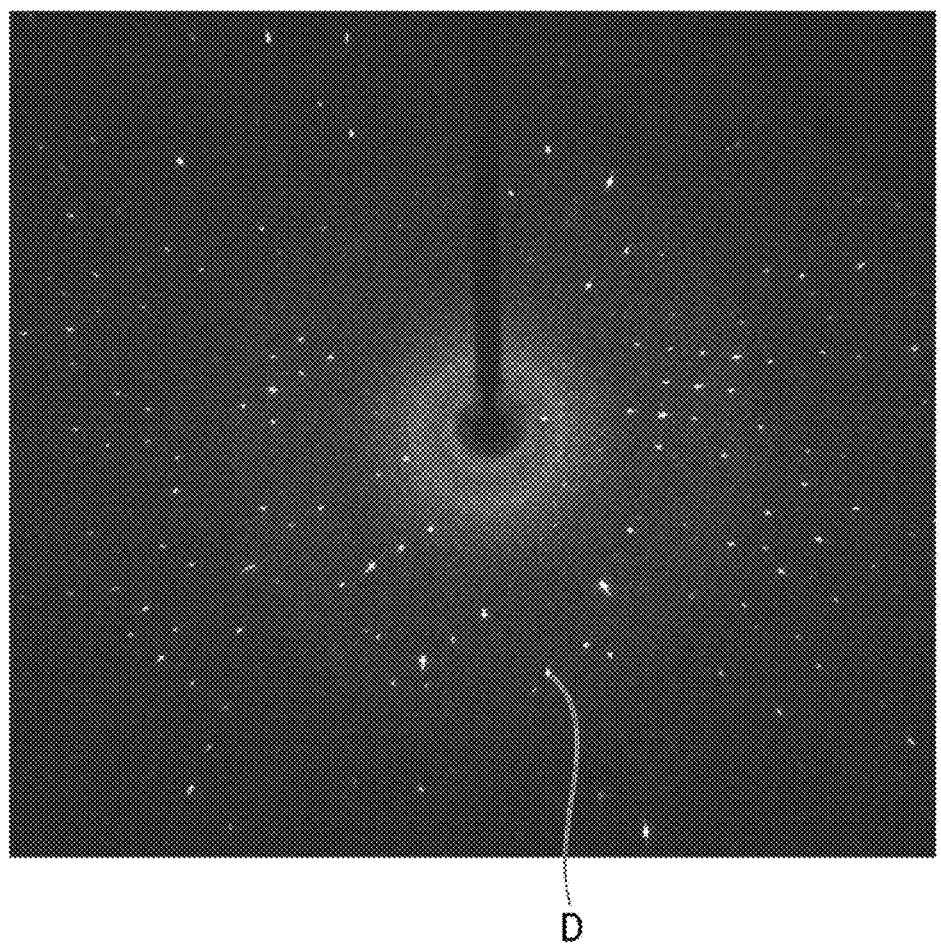
FIG. 14 is a single crystal X-ray diffraction pattern obtained with the $Li_{6.125}Ga_{0.125}La_3Zr_{1.5}Ta_{0.25}Nb_{0.25}O_{12}$ single crystal of FIG. 13.

The structure of the sample 5 was investigated in the same manner as in Example 1. FIG. 14 is an image showing the X-ray diffraction pattern obtained for the sample 5, and from this image, a diffraction point D unique to the single crystal structure could be clearly confirmed.

In a case where diffraction intensity data of the sample 5 was collected and the crystal structure was examined in the same manner as in Example 1, it was found that the sample 5 belonged to a space group I-43d in a cubic crystal. Using a diamond cutter, four thin pieces having a thickness of 0.1 cm were produced (cut out) from the sample 5, and relative densities of these pieces were calculated by the method described above. As a result, the relative densities were each 99.9%, 100%, 100%, and 100%.

Figure 15:
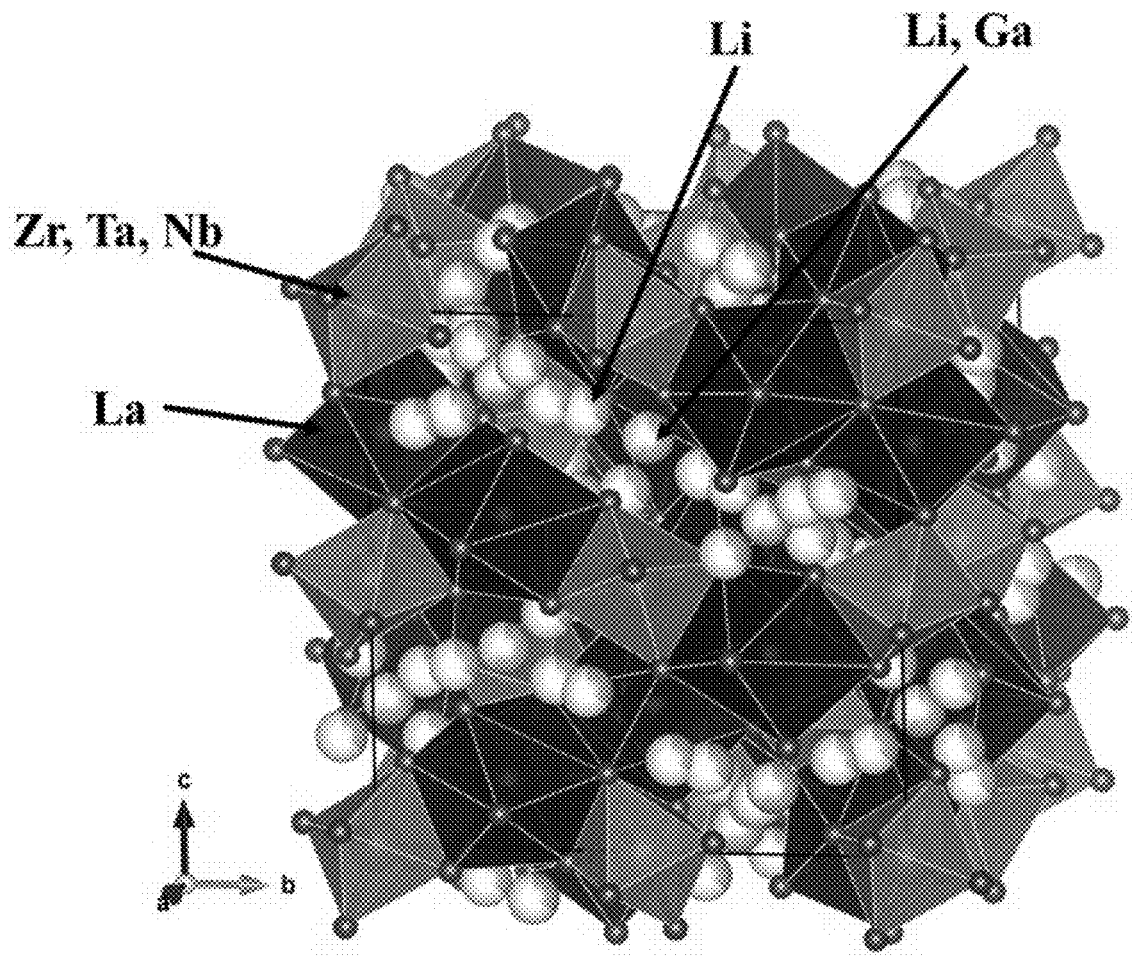
FIG. 15 is a schematic diagram showing a garnet structure of the $Li_{6.125}Ga_{0.125}La_3Zr_{1.5}Ta_{0.25}Nb_{0.25}O_{12}$ single crystal of FIG. 13.

FIG. 15 schematically shows the structure of the sample 5. $Li_{7-3x-w-y}Ga_xLa_3Zr_{2-w-y}Ta_wNb_yO_{12}$ having a cubic garnet structure, which has been produced by sintering a polycrystal as a raw material for lithium composite oxide by a generally known method for producing a solid electrolyte, belongs to a space group of Ia-3d same as $Li_{7-3x-y}Ga_xLa_3Zr_{2-y}Ta_yO_{12}$ as an analogous compound (for example, Non-Patent Document 5). On the other hand, the sample 5 grown by the melting method according to the above-described embodiment belonged to the space group of I-43d; and in the crystal structure, lanthanum occupied a site 24c (coordinate x=0.25, y=0.125, Z=0), zirconium and niobium occupied a site 16a (x=0, y=0, z=0), a site 12a (coordinate x=0.75, y=0.625, z=0), a site 12b (coordinate x=0.75, y=0.125, z=0), and two types of sites 48e (coordinate x=0.6798, y=0.5651, z=0.1439, and coordinate x=0.6913, y=0.5892, z=0.0816) were sites of lithium, and the sites 12a and 12b were sites of gallium. Thus, the sample 5 obtained in the case of producing by the melting method had a clearly different space group from the crystal produced by the sintering method as disclosed in Non-Patent Document 5, and it was found that the sample 5 was a novel substance having a different crystal structure. Since R factor indicating a reliability of the crystal structure analysis here was 1.62%, it could be judged that the result of the crystal structure analysis was appropriate.

Example 6

Example 6 differs from Example 1 in the mixing ratio of the raw materials.
(Mixing of Raw Materials of $Li_{5.55}Ga_{0.4}La_3Zr_{1.75}Ta_{0.125}Nb_{0.125}O_{12}$)

First, 26.2010 g of lithium carbonate $Li_2CO_3$ (manufactured by RARE METALLIC Co., Ltd., purity: 99.99%), 5.4746 g of gallium oxide $Ga_2O_3$ (manufactured by RARE METALLIC Co., Ltd., purity: 99.99%), 44.6055 g of lanthanum oxide $La_2O_3$ (manufactured by RARE METALLIC Co., Ltd., purity: 99.99%), 19.6817 g of zirconium oxide $ZrO_2$ (manufactured by RARE METALLIC Co., Ltd., purity: 99.99%), 2.5208 g of tantalum oxide $Ta_2O_5$ (manufactured by RARE METALLIC Co., Ltd., purity: 99.99%), and 1.5163 g of niobium oxide $Nb_2O_5$ (manufactured by RARE METALLIC Co., Ltd., purity: 99.99%) were placed in an agate mortar, and mixed uniformly by a wet method using ethanol. The lanthanum oxide had been pre-sintered in advance at 900° C. With regard to a molar ratio Li:Ga:La:Zr:Ta of the metals contained in the mixture, with respect to a stoichiometric ratio of $Li_{5.55}Ga_{0.4}La_3Zr_{1.75}Ta_{0.125}Nb_{0.125}O_{12}$ as a target product, the amount of lithium was set to 1.4 times the target composition and the amount of gallium was set to 1.6 times the target composition. That is, the chemical composition of the metals contained in the mixture was $Li_{7.77}Ga_{0.64}La_3Zr_{1.75}Ta_{0.125}Nb_{0.125}O_{12}$.

Next, an alumina crucible (manufactured by Nikkato Corporation, C3 model) with a lid was filled with 100 g of the mixture. The crucible was placed in a box-type electric furnace (manufactured by Yamato Scientific Co., Ltd., FP100 model), and pre-sintered at 850° C. for 6 hours to obtain a powder. The obtained powder was pulverized. More specifically, 100 g of the powder, 300 g of zirconia balls having a diameter of 5 mm, and 50 g of isopropanol were packed in a zirconia pulverizing container with a capacity of 250 mL, and using a planetary ball mill (manufactured by Fritsch GmbH, model: P-6), the first powder was pulverized by rotating the container at a revolution speed of 200 rpm for a total of 300 minutes. The pulverized powder was dried at 100° C. for 24 hours, and classified using a sieve with 250 μm openings.

Subsequently, the above-described mixture was used to grow, by the same method as the method for growing the sample 1 using the mixture in Example 1, a sample 6 as a high-density $Li_{5.55}Ga_{0.4}La_3Zr_{1.75}Ta_{0.125}Nb_{0.125}O_{12}$ crystal.

Figure 16:
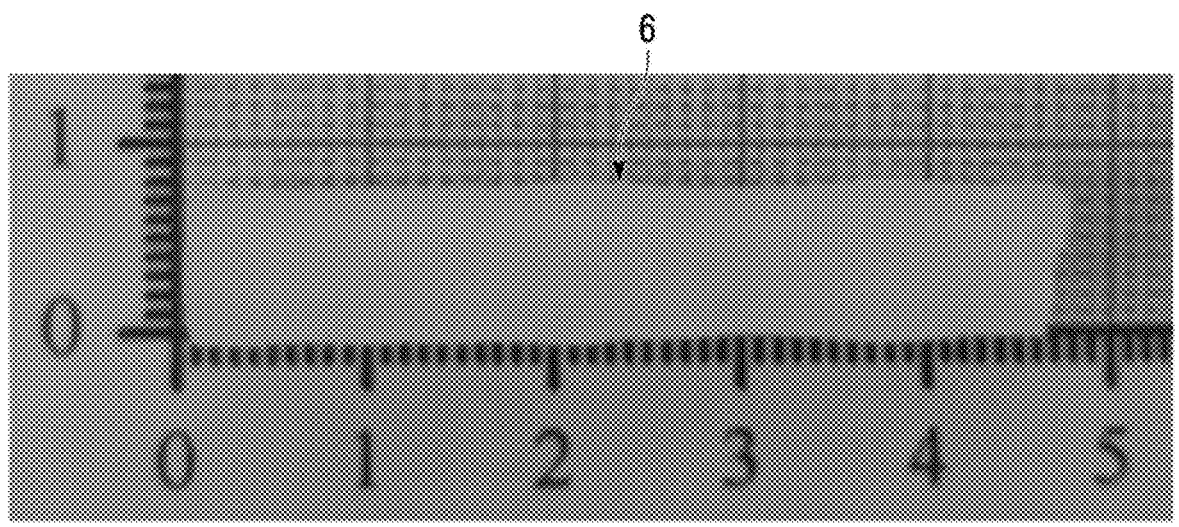
FIG. 16 is a photograph of the appearance of a $Li_{5.55}Ga_{0.4}La_3Zr_{1.75}Ta_{0.125}Nb_{0.125}O_{12}$ crystal grown by an FZ method in Example 6.

The chemical composition of the grown sample 6 was analyzed in the same manner as in Example 1. As a result of the analysis, the chemical composition of ICP-AES was Li:Ga:La:Zr:Ta:Nb=5.57:0.388:3.0:1.75:0.125:0.125. FIG. 16 is a photograph of the appearance of the sample 6. As shown in FIG. 16, the sample 6 had a diameter of approximately 9 mm and a length of approximately 45 mm.
(Evaluation of High-Density $Li_{5.55}Ga_{0.4}La_3Zr_{1.75}Ta_{0.125}Nb_{0.125}O_{12}$ Crystal)

Figure 17:
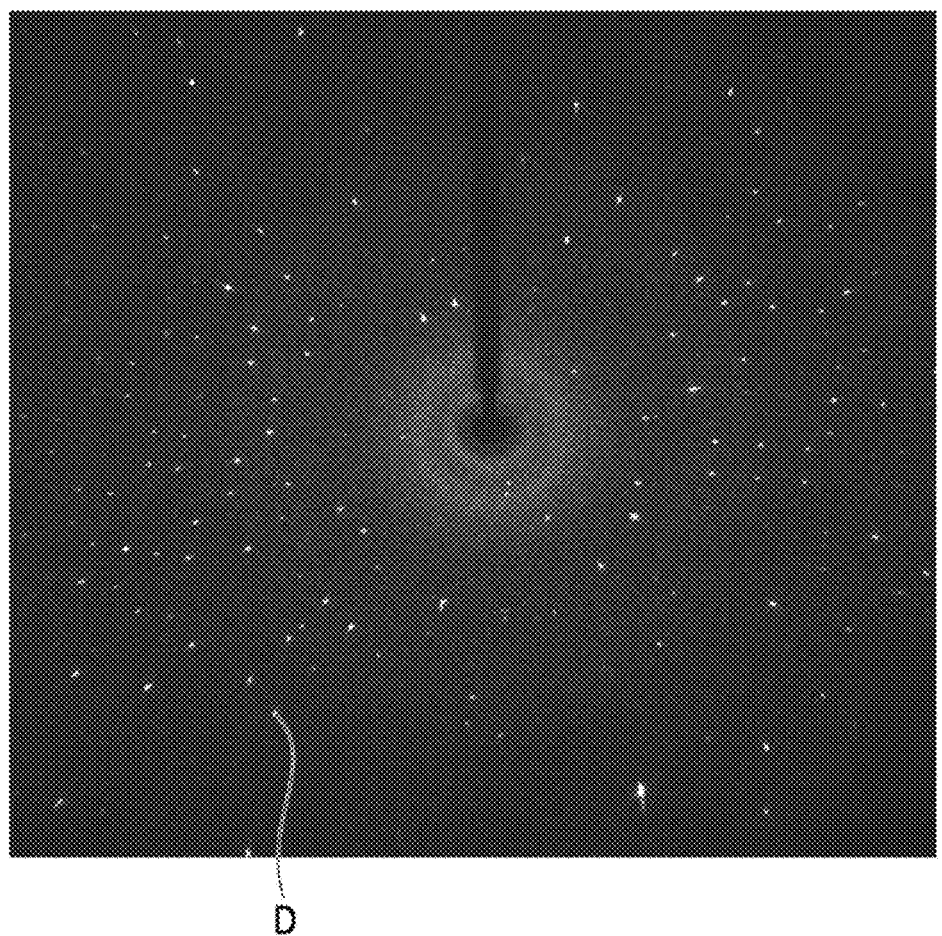
FIG. 17 is a single crystal X-ray diffraction pattern obtained with the $Li_{5.55}Ga_{0.4}La_3Zr_{1.75}Ta_{0.125}Nb_{0.125}O_{12}$ single crystal of FIG. 16.

The structure of the sample 6 was investigated in the same manner as in Example 1. FIG. 17 is an image showing the X-ray diffraction pattern obtained for the sample 6, and from this image, a diffraction point D unique to the single crystal structure could be clearly confirmed.

In a case where diffraction intensity data of the sample 6 was collected and the crystal structure was examined in the same manner as in Example 1, it was found that the sample 6 belonged to a space group I-43d in a cubic crystal. Using a diamond cutter, four thin pieces having a thickness of 0.1 cm were produced (cut out) from the sample 6, and relative densities of these pieces were calculated by the method described above. As a result, the relative densities were each 99.6%, 99.8%, 99.9%, and 100%.

Figure 18:
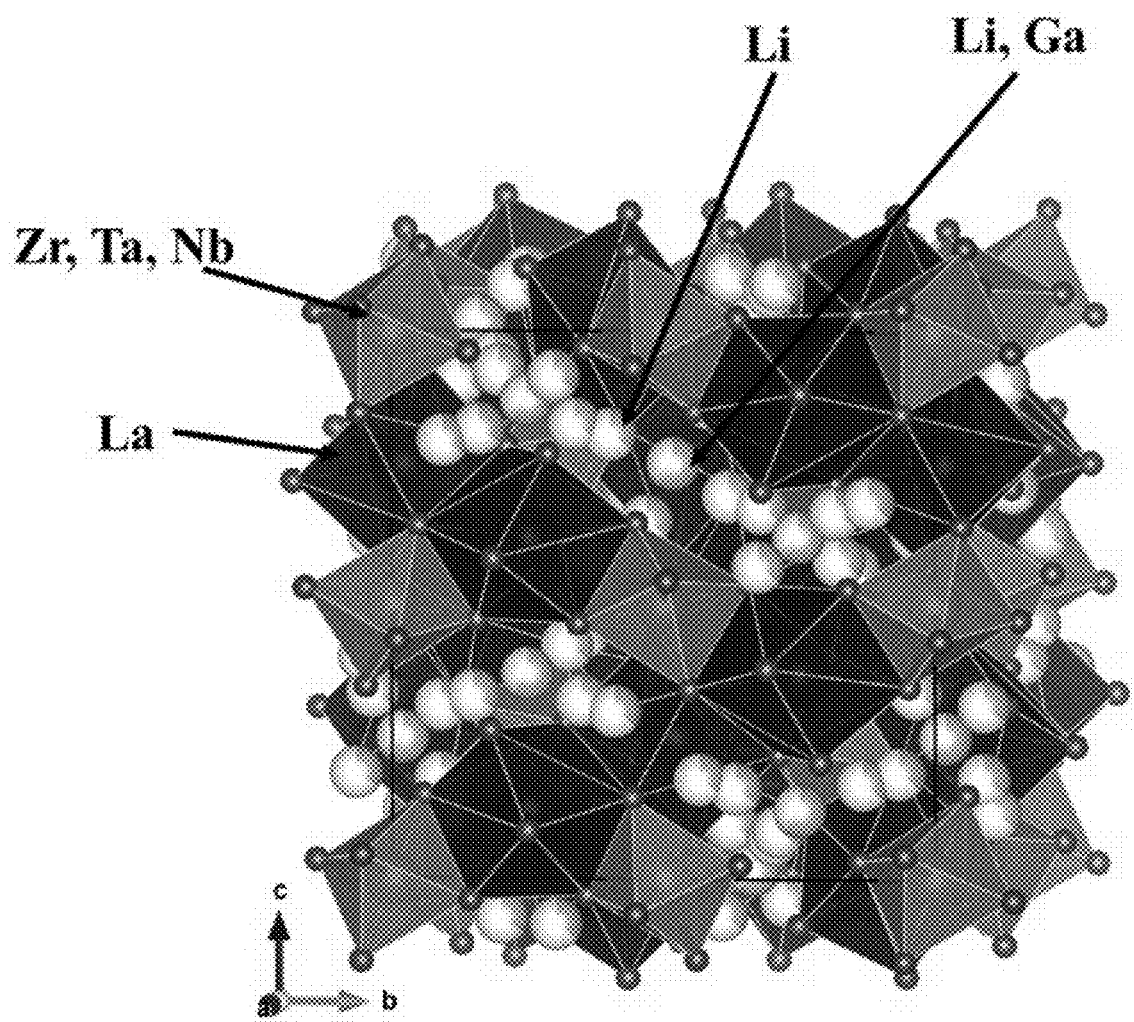
FIG. 18 is a schematic diagram showing a garnet structure of the $Li_{5.55}Ga_{0.4}La_3Zr_{1.75}Ta_{0.125}Nb_{0.125}O_{12}$ single crystal of FIG. 16.

FIG. 18 schematically shows the structure of the sample 6. $Li_{7-3x-w-y}Ga_xLa_3Zr_{2-w-y}Ta_wNb_yO_{12}$ having a cubic garnet structure, which has been produced by sintering a polycrystal as a raw material for lithium composite oxide by a generally known method for producing a solid electrolyte, belongs to a space group of Ia-3d same as $Li_{7-3x-y}Ga_xLa_3Zr_{2-y}Ta_yO_{12}$ as an analogous compound (for example, Non-Patent Document 5). On the other hand, the sample 6 grown by the melting method according to the above-described embodiment belonged to the space group of I-43d; and in the crystal structure, lanthanum occupied a site 24c (coordinate x=0.25, y=0.125, Z=0), zirconium and niobium occupied a site 16a (x=0, y=0, z=0), a site 12a (coordinate x=0.75, y=0.625, z=0), a site 12b (coordinate x=0.75, y=0.125, z=0), and two types of sites 48e (coordinate x=0.6784, y=0.5656, z=0.1442, and coordinate x=0.6937, y=0.5903, z=0.0822) were sites of lithium, and the sites 12a and 12b were sites of gallium. Thus, the sample 6 obtained in the case of producing by the melting method had a clearly different space group from the crystal produced by the sintering method as disclosed in Non-Patent Document 5, and it was found that the sample 6 was a novel substance having a different crystal structure. Since R factor indicating a reliability of the crystal structure analysis here was 2.92%, it could be judged that the result of the crystal structure analysis was appropriate.

Example 7

A lithium composite oxide single crystal produced in the same manner as in Example 1 was pulverized and sintered in the following procedure to produce a lithium composite oxide polycrystal.

Figure 19:
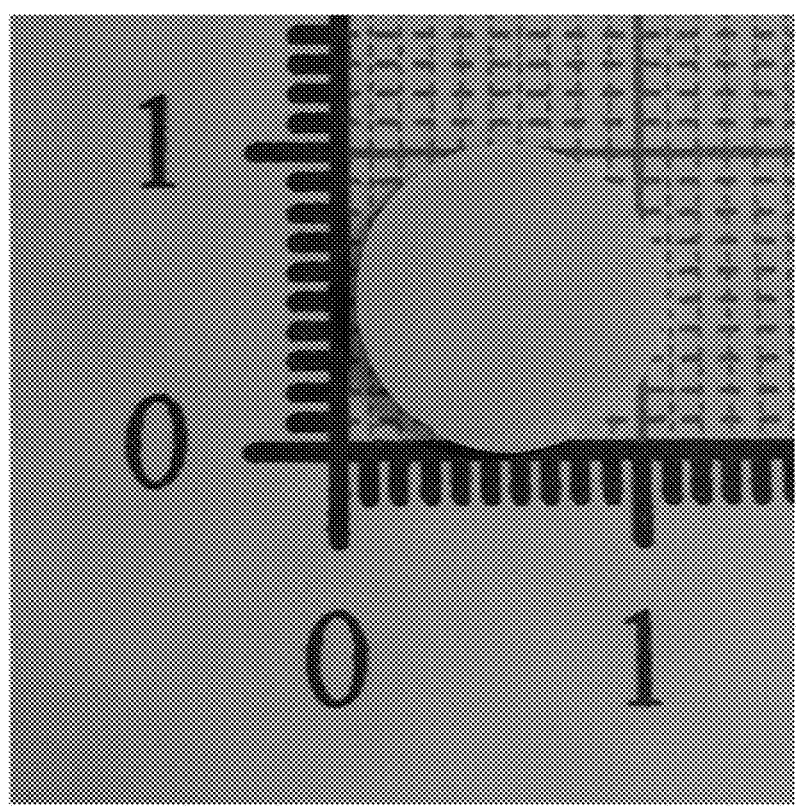
FIG. 19 is a photograph of the appearance of a lithium composite oxide polycrystal produced in Example 7.

First, the lithium composite oxide single crystal was roughly crushed in an agate mortar and then pulverized by grinding until it became powdery to form a polycrystalline powder of lithium composite oxide. Next, after filling approximately 0.4 g of the powder into a tablet molding machine with a diameter of approximately 10 mm, the powder was pressured with a hydraulic press by approximately 60 MPa to obtain a molded body. Next, the molded body was placed in a platinum crucible and sintered at 1150° C. for 4 hours using a box-type electric furnace (manufactured by DENKEN Co., Ltd., model: KDF009). FIG. 19 is a photograph of the appearance of the lithium composite oxide polycrystal obtained by the sintering. The lithium composite oxide polycrystal produced in Example 7 had a diameter of approximately 10 mm and a thickness of approximately 1.5 mm. Since the single crystal before crushing (the same lithium composite oxide single crystal as in Example 1) used for producing the lithium composite oxide polycrystal of Example 7 had a garnet structure belonging to the space group I-43d, and the polycrystal after crushing had a garnet structure in the powder X-ray diffraction pattern as shown in FIG. 5, the polycrystalline sintered body produced in this example was also a sintered body having the same crystal structure.

In this way, a polycrystalline sintered body could be produced by crushing the single crystal to produce a polycrystal, molding the polycrystal in a tablet molding machine, and sintering the polycrystal.

INDUSTRIAL APPLICABILITY

The high-density $Li_{7-3x-w-v}Ga_xLa_3Zr_{2-w-v}Ta_wNb_vO_{12}$ ($0.02 \leq x < 0.5$, $0 \leq W \leq 1.0$, $0 \leq V \leq 1.0$, and $0.05 \leq W+V \leq 1.0$) crystal according to the embodiment of the present invention can be used as a solid electrolyte material for an all-solid-state lithium-ion secondary battery.

REFERENCE SIGNS LIST

10: Evaluation device
11: Cell for battery evaluation
11A: Evaluation cell body
11B: Evaluation cell lid
12: Support means
12A: Base
12B: Spring
12C: Guide for spring
13: Silicon rubber O-ring
14: Fluororesin O-ring
15: Metal lithium plate
1, 2: Sample
2: Sample
B: Base material
D: Diffraction point

What is claimed is:

1. A lithium composite oxide single crystal having a chemical composition represented by $Li_{7-3x-w-v}Ga_xLa_3Zr_{2-w-v}Ta_wNb_vO_{12}$ ($0.02 \leq x < 0.5$, $0 \leq W \leq 1.0$, $0 \leq V \leq 1.0$, and $0.05 \leq W+V \leq 1.0$), which belongs to a space group I-43d in a cubic system and has a garnet structure.

2. A lithium composite oxide polycrystal comprising:
a single crystal having a chemical composition represented by $Li_{7-3x-w-v}Ga_xLa_3Zr_{2-w-v}Ta_wNb_vO_{12}$ ($0.02 \leq x < 0.5$, $0 \leq W \leq 1.0$, $0 \leq V \leq 1.0$, and $0.05 \leq W+V \leq 1.0$), which belongs to a space group I-43d in a cubic system and has a garnet structure.

3. The lithium composite oxide polycrystal according to claim 2,
wherein a relative density is 90% or more.

4. The lithium composite oxide polycrystal according to claim 2,
wherein a relative density is 95% or more.

5. A lithium composite oxide material comprising:
the lithium composite oxide single crystal according to claim 1.

6. A lithium composite oxide material comprising:
the lithium composite oxide polycrystal according to claim 2.

7. A solid electrolyte material comprising:
the lithium composite oxide single crystal according to claim 1.

8. A solid electrolyte material comprising:
the lithium composite oxide polycrystal according to claim 2.

9. The solid electrolyte material according to claim 8,
wherein a lithium ionic conductivity is $1.0 \times 10^{-3}$ S/cm or more.

10. An all-solid-state lithium-ion secondary battery comprising:
a positive electrode;
a negative electrode; and
the solid electrolyte material according to claim 8.

11. A method for producing a solid electrolyte material, comprising:
a first step of melting a material having a chemical composition represented by $Li_{(7-3x-w)y}Ga_xLa_3Zr_{2-w}Ta_wNb_vO_{12}$ ($0.02 \leq x < 0.5$, $1.1 \leq y \leq 1.4$, $1.6 \leq z \leq 3.3$, $0 \leq W \leq 1.0$, $0 \leq V \leq 1.0$, $0.05 \leq W+V \leq 1.0$, $1.1 \leq y \leq 1.5$, and $1.5 \leq z \leq 3.5$), and
producing the solid electrolyte material from the melted material.

12. A method for producing a solid electrolyte material according to claim 11, comprising:
a melted portion forming step, which is the first step, of melting at least a part of a rod-shaped base material containing a raw material having a chemical composition represented by $Li_{(7-3x-w)y}Ga_{xz}La_3Zr_{2-w}Ta_wNb_vO_{12}$ ($0.02 \leq x < 0.5$, $1.1 \leq y \leq 1.4$, $1.6 \leq z \leq 3.3$, $0 \leq W \leq 1.0$, $0 \leq V \leq 1.0$, $0.05 \leq W+V \leq 1.0$, $1.1 \leq y \leq 1.5$, and $1.5 \leq z \leq 3.5$) to form a melted portion; and
a melted portion moving step of moving the melted portion at an average speed of 8 mm/h or more.

13. The method for producing a solid electrolyte material according to claim 12,
wherein the average speed is 8 mm/h or more and 19 mm/h or less.

14. The method for producing a solid electrolyte material according to claim 12,
wherein, in the melted portion forming step, the base material is rotated together with the melted portion at a rotation speed of 30 rpm or more in a plane perpendicular to a longitudinal direction.

15. The method for producing a solid electrolyte material according to claim 12,
wherein the melted portion moving step is performed in a dry gas atmosphere in a state in which a seed crystal of a solid electrolyte is attached to the melted portion,
and wherein the melted portion is solidified in the melted portion moving step,
and wherein the dry gas atmosphere is oxygen, nitrogen, argon, or air.

16. The method for producing a solid electrolyte material according to claim 12,
wherein, in the melted portion moving step, the melted portion is rotated at a rotation speed of 2 rpm or more and 8 rpm or less in a plane perpendicular to a longitudinal direction of the base material.

17. A method for producing a solid electrolyte material according to claim 11, comprising:
a melt forming step, which is the first step, of melting a raw material having a chemical composition represented by $Li_{(7-3x-w)y}Ga_{xz}La_3Zr_{2-w}Ta_wNb_vO_{12}$ ($0.02 \leq x < 0.5$, $1.1 \leq y \leq 1.4$, $1.6 \leq z \leq 3.3$, $0 \leq W \leq 1.0$, $0 \leq V \leq 1.0$, $0.05 \leq W+V \leq 1.0$, $1.1 \leq y \leq 1.5$, and $1.5 \leq z \leq 3.5$) in a crucible to form a melt of the raw material;

a melt adhesion step of immersing a base material in the melt in the crucible and adhering the melt to the base material; and a melt moving step of moving the melt adhered to the base material together with the base material out of the crucible at an average speed of 8 mm/h or more.

18. The method for producing a solid electrolyte material according to claim 17,
wherein the average speed is 8 mm/h or more and 19 mm/h or less.

19. The method for producing a solid electrolyte material according to claim 17,
wherein the melt moving step is performed in a state in which a seed crystal of a solid electrolyte is attached to the base material.

20. The method for producing a solid electrolyte material according to claim 17,
wherein, in the melt portion moving step, the base material having a rod shape is rotated at a rotation speed of 2 rpm or more and 8 rpm or less in a plane perpendicular to a longitudinal direction with respect to the melt.

* * * * *